US008393966B2

(12) United States Patent
Yamada et al.

(10) Patent No.: US 8,393,966 B2
(45) Date of Patent: Mar. 12, 2013

(54) GAME SYSTEM AND STORAGE MEDIUM STORING GAME PROGRAM

(75) Inventors: Yoichi Yamada, Kyoto (JP); Minoru Narita, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 489 days.

(21) Appl. No.: 12/643,539

(22) Filed: Dec. 21, 2009

(65) Prior Publication Data

US 2010/0099498 A1 Apr. 22, 2010

Related U.S. Application Data

(62) Division of application No. 11/121,914, filed on May 5, 2005, now Pat. No. 7,635,305.

(30) Foreign Application Priority Data

May 6, 2004 (JP) ................................ 2004-137401

(51) Int. Cl.
*A63F 13/12* (2006.01)

(52) U.S. Cl. ................ 463/39; 463/29; 463/40; 463/42; 273/108.1; 273/317.1; 273/461; 455/41.2; 455/151.2; 455/512; 455/513; 345/2.3

(58) Field of Classification Search .................. 463/1–5, 463/7–8, 16, 20, 22–24, 29–34, 36–37, 39–40, 463/42–43, 46–47; 273/108.1, 138.1, 138.2, 273/139, 141 A, 141 R, 142 A, 142 B, 142 C, 273/142 H, 142 HA, 142 J, 142 R, 143 A, 273/143 C, 143 R, 148 B, 317.1, 460–461; 455/41.2, 106, 134, 136, 138, 140, 151.2, 455/153.2, 226.2, 300, 311, 420, 426.1–426.2, 455/500, 512–513, 526, 554.2, 555, 575.5; 381/311, 315; 370/913; 340/5.61, 5.64, 340/825.69, 825.72; 345/2.3; 902/23; 714/47–49, 714/735–737
See application file for complete search history.

(56) References Cited

U.S. PATENT DOCUMENTS 5,605,505 A * 2/1997 Han ................................ 463/39
5,618,045 A * 4/1997 Kagan et al. .................... 463/40
(Continued)

FOREIGN PATENT DOCUMENTS

JP 02-183397 7/1990
JP 08-065313 3/1996
(Continued)

OTHER PUBLICATIONS

Japanese Office Action dated Jun. 28, 2011.

*Primary Examiner* — James S McClellan
(74) *Attorney, Agent, or Firm* — Nixon & Vanderhye P.C.

(57) ABSTRACT

A game system includes a plurality of game apparatuses that can carry out short-range wireless communication with one another. One of the game apparatuses functions as a parent apparatus, and at least one other game apparatus functions as a child apparatus. The parent apparatus transmits transmission verification data a predetermined number of times. Accordingly, the child apparatus receives the transmission verification data from the parent apparatus, and transmits to the parent apparatus the same number of pieces of reception verification data as those of the received transmission verification data. The parent apparatus receives the reception verification data from the child apparatus, and detects the number of the received pieces of reception verification data. Also, the parent apparatus varies a game process according to the number of the received pieces of data detected in communication with each child apparatus, and, for example, decides a communication priority rank of each child character based on the number of the received pieces of data. In addition, the child apparatus varies a game process according to the number of the received pieces of data corresponding to this apparatus itself.

11 Claims, 17 Drawing Sheets

U.S. PATENT DOCUMENTS

| | | | |
|---|---|---|---|
| 5,797,085 A * | 8/1998 | Beuk et al. | 455/88 |
| 6,524,189 B1 * | 2/2003 | Rautila | 463/40 |
| 6,786,826 B2 * | 9/2004 | Himoto et al. | 463/43 |
| 7,164,887 B2 * | 1/2007 | Tanada et al. | 455/41.2 |
| 7,803,052 B2 * | 9/2010 | Multerer et al. | 463/42 |
| 7,881,713 B2 * | 2/2011 | Hale et al. | 455/422.1 |
| 2005/0285740 A1 * | 12/2005 | Kubach et al. | 340/572.1 |

FOREIGN PATENT DOCUMENTS

| | | |
|---|---|---|
| JP | 10-151274 | 6/1998 |
| JP | 11-234297 | 8/1999 |
| JP | 2000-126445 | 5/2000 |
| JP | 2001-017745 | 1/2001 |
| JP | 2001-321568 | 11/2001 |
| JP | 2002-044730 | 2/2002 |
| JP | 2002-078976 | 3/2002 |
| JP | 2002-126353 | 5/2002 |
| JP | 2002-281566 | 9/2002 |
| JP | 2004-275412 | 10/2004 |

* cited by examiner

PARENT COMMUNICATION DATA

| COMMUNICATION PRIORITY RANK DATA |
| --- |
| PRIORITY RANK OF FIRST CHILD APPARATUS |
| PRIORITY RANK OF SECOND CHILD APPARATUS |
| ⋮ |
| PRIORITY RANK OF N-th CHILD APPARATUS |

CHILD COMMUNICATION DATA
(i-th CHILD APPARATUS)

| POSITION DATA |
| --- |
| i-th PLAYER CHARACTER |

(B)

PARENT COMMUNICATION DATA

| POSITION DATA |
| --- |
| PLAYER CHARACTER OF PARENT APPARATUS |
| FIRST PLAYER CHARACTER |
| SECOND PLAYER CHARACTER |
| ⋮ |
| N-th PLAYER CHARACTER |

| DATA ON NUMBER-OF-RECEIVED DATA |
| --- |
| NUMBER OF RECEIVED PIECE(S) OF DATA FOR FIRST CHILD APPARATUS |
| NUMBER OF RECEIVED PIECE(S) OF DATA FOR SECOND CHILD APPARATUS |
| ⋮ |
| NUMBER OF RECEIVED PIECE(S) OF DATA FOR N-th CHILD APPARATUS |

GAME SYSTEM AND STORAGE MEDIUM STORING GAME PROGRAM

RELATED APPLICATION

This application is a divisional of application Ser. No. 11/121,914, filed May 5, 2005, and claims priority to Japanese Patent Application No. 2004-137401 filed 6 May 2004 which applications are both incorporated in their entirety by reference herein.

BACKGROUND AND SUMMARY

1. Field

The illustrative embodiments relate to a game system and a storage medium storing a game program. More specifically, the illustrative embodiments relate to a game system and a storage medium storing a game program, which allow a game to be performed among a plurality of game apparatus by means of short-range wireless communication.

2. Description of the Prior Art

One example of a conventional game system of this kind is disclosed in reference document 1 (Japanese Patent Laying-open No. 2000-126445). In the game system of the reference document 1, the state of wireless communication with another game apparatus is indicated by means of symbols, characters or patterns. For example, when communication data is received from the other game apparatus, the symbol "*" indicative of communication in process is displayed. Also, if the communication stops dead and a communication error occurs, the symbol "?" indicative of disabled communication is provided.

Additionally, document 2 (Japanese Patent Laying-open No. 2002-126353) discloses a game system in which wireless communication is carried out between a wireless controller and the main body of a game machine, and a signal strength in the wireless communication is reflected on a game display screen. In this game system, the field intensity of a received signal is detected at the main body of the game machine, and the information displayed on the screen is modified according to this received signal strength. For instance, when a player with the controller moves away from the main body of the game machine, a character displayed on the display screen comes to the fore. In this manner, modifying the information displayed on the screen in accordance with the actual movement of the player allows the game to be close to realistic experiences.

Regarding the prior art of document 1, however, the state of communication with the other game apparatus is displayed as a symbol, etc. Therefore, the game details are not varied according to the communication state, which may make it difficult to continuously attract the player's interest in this game system.

Additionally, with the prior art of document 2, the displayed information is modified according to the signal strength between the wireless controller and the main body of the game machine, that is, according to the distance between the player and the display screen. As a consequence, no change is made to the progress of the game itself, even if the distance between the player and the display screen varies, and it may thus be difficult to keep the player's interest engaged in this game system.

Besides, according to the prior art of document 2, the strength of a signal from the controller is detected, and thus it may be necessary to set up a circuit for detection of radio field intensity. Setting up this strength detecting circuit may be no special issue for the main body of a game console connected to a TV receiving set as described in the document 2, However, contemplating its application to a wireless communication game system using hand-held game machines, it may be difficult to provide a hand-held game machine with such a radio field intensity detecting circuit because there may be some limitations on the size and shape of the hand-held game machine.

The illustrative embodiments provide a novel game system and storage medium storing a game program.

In one illustrative embodiment, a game system and storage medium storing a game program makes a change to game details according to the communication state in the game system in which wireless communication is carried out.

A game system according to an illustrative embodiment is a game system including a first game apparatus and at least one second game apparatus which can carry out short-range wireless communication with one another. The first game apparatus comprises a first transmitting means, a first receiving means, a number-of-received data detecting means and a first game processing means. The second game apparatus comprises a second receiving means and a second transmitting means. In the first game apparatus, the first transmitting means transmits to the second game apparatus a predetermined number of pieces (wherein the term pieces means at least one piece) of first verification data for verifying a communication state. The first receiving means receives second verification data transmitted from the second game apparatus. The number-of-received data detecting means detects the number of the received pieces of data of second verification data received by the first receiving means. The first game processing means varies a game process according to the number of the received pieces of data. In the second game apparatus, the second receiving means receives the first verification data transmitted from the first game apparatus. The second transmitting means transmits to the first game apparatus the same number of pieces of the second verification data as those of the first verification data received by the second receiving means.

More specifically, the game system includes the first game apparatus (10: a reference numeral used for illustrative purposes.) and at least one second game apparatus (10) which can carry out short-range wireless communication with one another. In an illustrative embodiment, the first game apparatus functions as a parent apparatus and the second game apparatus functions as a child apparatus. The first transmitting means (42, 76, S3, S73) of the first game apparatus transmits to the second game apparatus a predetermined number of pieces of first verification data for verifying a communication state. In response to that, the second receiving means (42, 78, S41, S121) of the second game apparatus receives the first verification data transmitted from the first game apparatus. Then, the second transmitting means (42, 76, S43, S123) transmits to the first game apparatus the same number of pieces of the second verification data as those of the first verification data received by the second receiving means. In response to that, the first receiving means (42, 78, S5, S75) of the first game apparatus receives the second verification data transmitted from the second game apparatus. The number-of-received data detecting means (42, 80, S7, S77) detects the number of received pieces of data of the second verification data received by the first receiving means. The detected number of the received pieces of data is the number of pieces of received second verification data that has been transmitted from the child apparatus in response to the transmission of the predetermined number of pieces of first verification data from the first game apparatus. This reflects the communication state between the first game apparatus and the second game apparatus. Then, the first game processing means (42, 82, 84, 88, S13, S83, S85) varies a game process according to the number of received pieces of data.

Thus, a predetermined number of pieces of the first verification data for verifying the communication state are transmitted, the number of the received pieces of data of second verification data transmitted from the other game apparatus in response to that is detected, and then the game process is varied according to the detected number of the received pieces of data. This makes it possible to provide a novel and interesting game system in which game details are changed according to the communication state between the game apparatus.

In one illustrative embodiment, the game system includes a plurality of second game apparatus. The first game processing means changes a priority rank of communication with each of the second game apparatus according to the number of the received pieces of data.

More specifically, the first game processing means (82, S13) of the first game apparatus changes a priority rank of communication with each of the plurality of second game apparatus according to the number of the received pieces of data. Thus, if there exist a plurality of the second game apparatus communicable with the first game apparatus, the priority rank of communication with each of the second game apparatus can be changed according to the number of the received pieces of data detected in communication with each of the second game apparatus, which makes it possible to provide a highly entertaining communication game.

In one aspect, the first game apparatus further comprises a first displaying means for displaying the communication priority rank changed by the first game processing means. The first transmitting means transmits to each of the second game apparatus data on the communication priority rank changed by the first game processing means. The second game apparatus further comprises a second displaying means for displaying its communication priority rank, based on the data on communication priority rank transmitted from the first game apparatus.

More specifically, the first displaying means (42, 24, S15) of the first game apparatus displays the communication priority rank changed by the first game processing means. Also, the first transmitting means (42, 76, S19) transmits to each of the second game apparatus data on the communication priority rank changed by the first game processing means. In response to that, the second displaying means (42, 24, S47) of the second game apparatus displays its communication priority rank based on the data on communication priority rank transmitted from the first game apparatus. Therefore, by displaying on each of the game apparatus the communication priority rank based on the number of the received pieces of data, it is possible to inform the communication priority rank to the player of each of the game apparatus. This allows each player of the second game apparatus to easily know whether the communication state of his second game apparatus is good or bad in comparison with other players' second game apparatus.

In another illustrative embodiment, the first transmitting means transmits to the second game apparatus the number of the received pieces of data detected by the number-of-received data detecting means. The second game apparatus further comprises a second game processing means for varying the game process according to the number of the received pieces of data transmitted from the first game apparatus.

More specifically, the first transmitting means (42, 76, S97) of the first game apparatus transmits to the second game apparatus the number of the received pieces of data detected by the number-of-received data detecting means. In response to that, the second game processing means (42, 84, 88, S135, S143) of the second game apparatus varies the game process according to the number of the received pieces of data transmitted from the first game apparatus. Accordingly, the second game apparatus can also vary the game process according to the number of the received pieces of data detected in communication with the first game apparatus. This means that it is possible to change the game details according to the communication state between the game apparatus, thereby providing a further novel and interesting game system.

The first game apparatus may further comprise a first displaying means for displaying a game space containing at least a first player character operated by the player of the first game apparatus and a second player character operated by the player of the second game apparatus. The first game processing means changes the size of at least one of the first player character and the second player character displayed on the first displaying means, depending on the number of the received pieces of data. The second game apparatus further comprises a second displaying means for displaying a game space containing at least the first player character and the second player character. The second game processing means changes the size of at least one of the first player character and the second player character displayed on the second displaying means, depending on the number of the received pieces of data.

More specifically, the first displaying means (42, 24, 86, S99, S101) of the first game apparatus displays a game space containing at least the first player character (PC1) operated by the player of the first game apparatus and the second player character (PC2) operated by the player of the second game apparatus. Also, the first game processing means (42, 84, S83) changes the size of at least one of the first player character and the second player character, depending on the number of the received pieces of data. In addition, the second displaying means (42, 24, 86, S139, S141) of the second game apparatus displays a game space containing at least the first player character and the second player character. Moreover, the second game processing means (42, 84, S135) changes the size of at least one of the first player character and the second player character, depending on the number of the received pieces of data. Therefore, by changing the size of the player character displayed on the screen depending on the detected number of the received pieces of data, it is possible to change the game details according to the communication state.

In another illustrative embodiment, the first game processing means reduces the size of the second player character displayed on the first displaying means as the number of the received pieces of data is smaller. The second game processing means reduces the size of the first player character displayed on the second displaying means as the number of the received pieces of data is smaller.

More specifically, the first game processing means reduces the size of the second player character operated by the communication partner as the number of the received pieces of data is smaller. Also, the second game processing means reduces the size of the first player character operated by the communication partner as the number of the received pieces of data is smaller. Thus, the partner's player character is changed to a smaller size according to the detected number of the received pieces of data, which makes it possible to provide a highly interesting game in which a sense of distance between the player characters in the virtual game space varies depending on the quality of the state of communication with the game apparatus of the partner player.

In another aspect, the first game apparatus further comprises a sound outputting means for outputting a sound. The first game processing means changes sound data to be output to the sound outputting means according to the number of the received pieces of data.

More specifically, the first game apparatus further comprises a sound outputting means (28, 54) for outputting a sound. Also, the first game processing means (42, 88, S85) changes sound data to be output to the sound outputting means according to the number of the received pieces of data. Therefore, it is possible to change such a sound as BGM for the game according to the detected number of the received pieces of data. Also, the player can easily know whether the communication state of his game apparatus is good or bad from the output sound.

A storage medium storing a game program according to one illustrative embodiment is a storage medium storing a game program to be executed by a game apparatus in a game system that includes a plurality of game apparatus capable of carrying out short-range wireless communication with one another and in which one of the game apparatus functions as a parent apparatus and at least one other game apparatus functions as a child apparatus. The game program in this storage medium causes a processor of the game apparatus functioning as a parent apparatus to perform a first transmitting step, a first receiving step, a number-of-received data detecting step, and a first game processing step. In the first transmitting step, a predetermined number of pieces of first verification data for verifying a communication state are transmitted to the child apparatus. In the first receiving step, second verification data transmitted from the child apparatus is received. In the number-of-received data detecting step, the number of the received pieces of data of second verification data received in the first receiving step is detected. In the first game processing step, the game process is varied according to the number of the received pieces of data. The game program in this storage medium also causes a processor of the game apparatus functioning as a child apparatus to perform a second receiving step and a second transmitting step. In the second receiving step, the first verification data transmitted from the parent apparatus is received. In the second transmitting step, the same number of pieces of the second verification data as those of the first verification data received in the second receiving step are transmitted to the parent apparatus.

As well as the above mentioned game system, this storage medium storing a game program makes it possible to provide a novel and interesting game in which the game details are changed according to the state of communication between the game apparatus.

According to an illustrative embodiment, the number of the received pieces of verification data transmitted from the other game apparatus according to the transmission of a predetermined number of the pieces of verification data is detected, and the game process is varied according to the detected number of the received pieces of data. This makes it possible to change the game details according to the communication state between the game apparatus in the game system in which wireless communication is carried out, thereby providing a novel and interesting game.

The above described aspects the illustrative embodiments will become more apparent from the following detailed description of the illustrative embodiments when taken in conjunction with the accompanying drawings.

BRIEF DESCRIPTION OF THE DRAWINGS

FIG. 16 (A) is an illustrative view showing one example of contents of child communication data transmitted from the child apparatus, and FIG. 16 (B) is an illustrative view showing one example of contents of the parent communication data transmitted from the parent apparatus;

DETAILED DESCRIPTION OF THE ILLUSTRATIVE EMBODIMENTS

Figure 1:
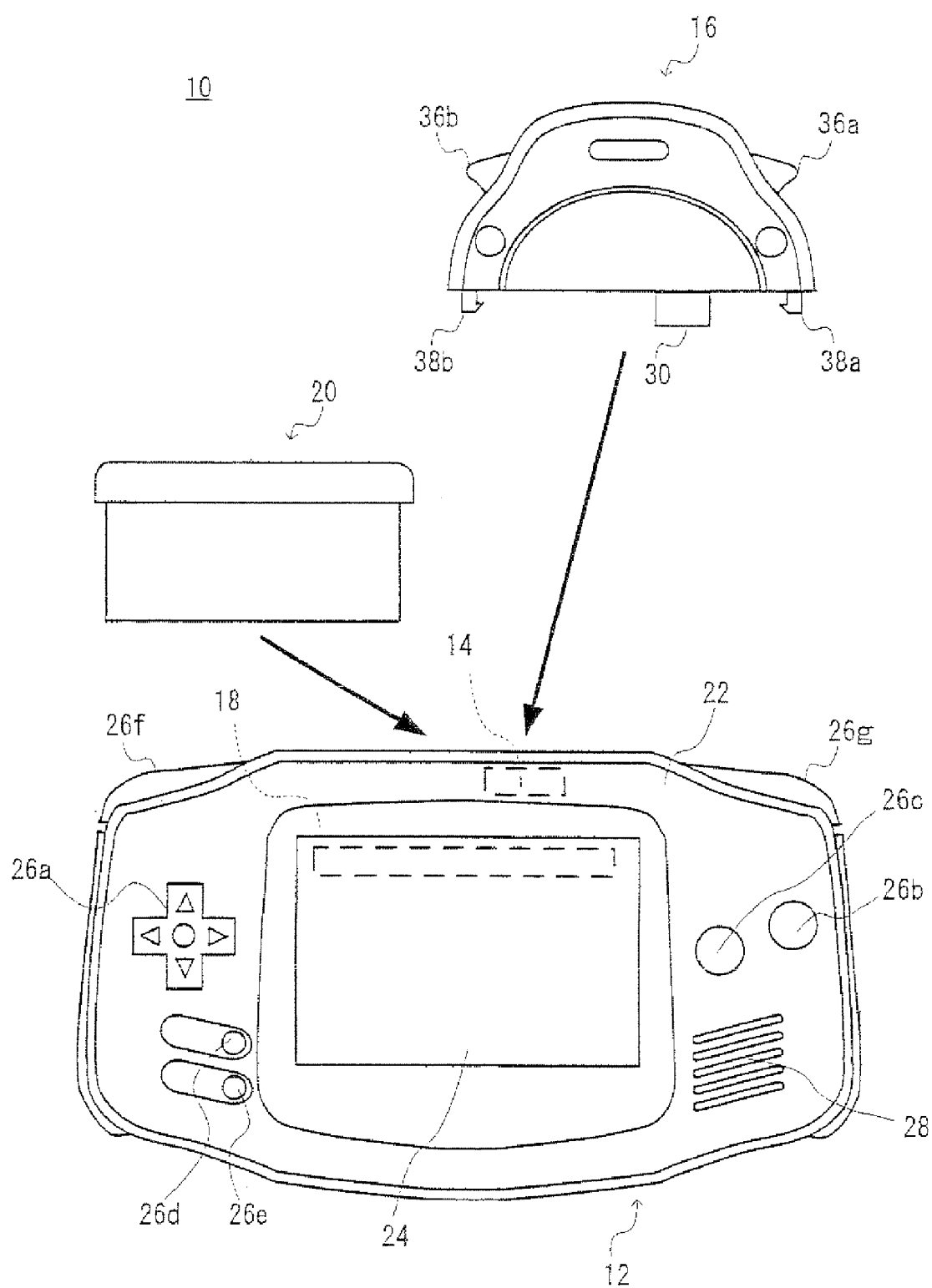
FIG. 1 is an outline view showing one example of a game apparatus used in one exemplary game system according to an illustrative embodiment.

According to an exemplary game system of the illustrative embodiments, a hand-held game apparatus as shown in FIG. 1 (hereinafter referred to simply as "game apparatus") is used. In this illustrative embodiment, the game apparatus 10 includes a hand-held game machine (hereinafter referred to simply as "game machine") 12 such as GAMEBOY ADVANCE (product name), a wireless communication unit 16 connected to a communication connector 14 of the game machine 12, and a game cartridge (hereinafter referred to as simply "cartridge") 20 connected to a cartridge connector 18.

Additionally, the game machine 12 is not limited to hand-held game machines. Notebook PCs, cellular phones and personal digital assistants may be applied to this game machine, for example. Also, a game information storage medium is not limited to the cartridge 20. Applicable to this medium are various types of information storage media including optical information storage media such as CD-ROMs and DVD-ROMs, magnet optical discs, magnetic discs, and memory cards.

The game machine 12 includes a horizontally oriented housing 22, for example. Formed on an approximate center of one main surface (front side) of the housing 22 is a liquid crystal display (hereinafter abbreviated as "LCD") 24 as one example of an image displaying means. Also, operating switches 26a to 26g (collectively indicated with a reference numeral "26") are provided at the right and left ends of the housing 22 on the both sides of the LCD 24 as an operating means for the player to perform a game operation. Additionally, a speaker 28 is contained inside a sound release hole provided on the surface of the housing 22 and outputs such sounds as BGM and sound effects during the game.

The operating switch 26 includes a direction switch 26a, an A button 26b, a B button 26c, a start button 26d, a select button 26e, an L button 26f provided in a left corner of the housing 22, and an R button 26g provided in a right corner of the housing 22. Operations specified by individual switches or buttons included in the operating switch 26 vary depending on a game program processed in the game apparatus 10. As an example, the direction switch 26a is used to specify the direction of movement of a player character (a character operated by the player) and move a cursor for selecting an option. The A button 26b is used to specify the action of a player character (making a jump, swing a sword, etc.) and confirm the selection of an option. The B button 26c is utilized for cancellation of a selected option item. The L button 26f and the R button 26g are used to specify actions assigned to the A button 26b and the B button 26c and other actions. The start button 26d and the select button 26e are utilized to start playing a game and stop a game operation.

In addition, the communication connector 14 (indicated by a dotted line) is provided on an upper part of rear side of the housing 22. The communication connector 14 is connected with a connector 30 of the wireless communication unit 16, which establishes electrical connection between the game machine 12 and the wireless communication unit 16. Moreover, formed on the upper part of rear side of the housing is an insertion hole (not illustrated) for detachably attaching the cartridge 20 to the housing, and provided on a bottom of the insertion hole is the cartridge connector 18 (indicated by a dotted line) for electrical connection with the cartridge 20.

The cartridge 20 is an information storage medium for storing a game program and data. By attaching the cartridge 20 to the game machine 12, a semiconductor memory and the like (a ROM 32 and a backup RAM 34 shown in FIG. 2) contained in the cartridge 20 are electrically connected with the game machine 12.

An exemplary wireless communication unit 16 has the connector 30 provided on its lower part, a pair of knob portions 36a and 36b provided on its upper part, a pair of engaging portions 38a and 38b provided on its lower part as with the connector 30. The knob portions 36a and 36b protrude right and left from the upper part of the wireless communication unit 16. When the player pulls the both portions in an inward direction from the outside, the engaging portions 38a and 38b protruding from the lower part move outward. Then, when the player stops operating the knob portions 36a and 36b, the engaging portions 38a and 38b each move in an inward direction because the both knob portions 36a and 36b are urged in an outward direction. Meanwhile, formed on the upper part of rear side of the housing 22 of the game machine 12 are engaging holes (not illustrated) for engaging the engaging portions 38a and 38b, respectively. When the player connects the connector 30 of the wireless communication unit 16 to the communication connector 14 of the game machine 12 and also engages the engaging portions 38a and 38b in the above mentioned engaging holes, the wireless communication unit 16 is attached to the game machine 12. The wireless communication unit 16 outputs communication data received from another game apparatus 10 to the game machine 12, and also transmits communication data output from the game machine 12 to the other game apparatus 10. Additionally, an antenna for the wireless communication unit 16 to carry out wireless communication with the other game apparatus 10 is formed on a substrate inside the housing and is not exposed to the outside of the housing.

Figure 2:
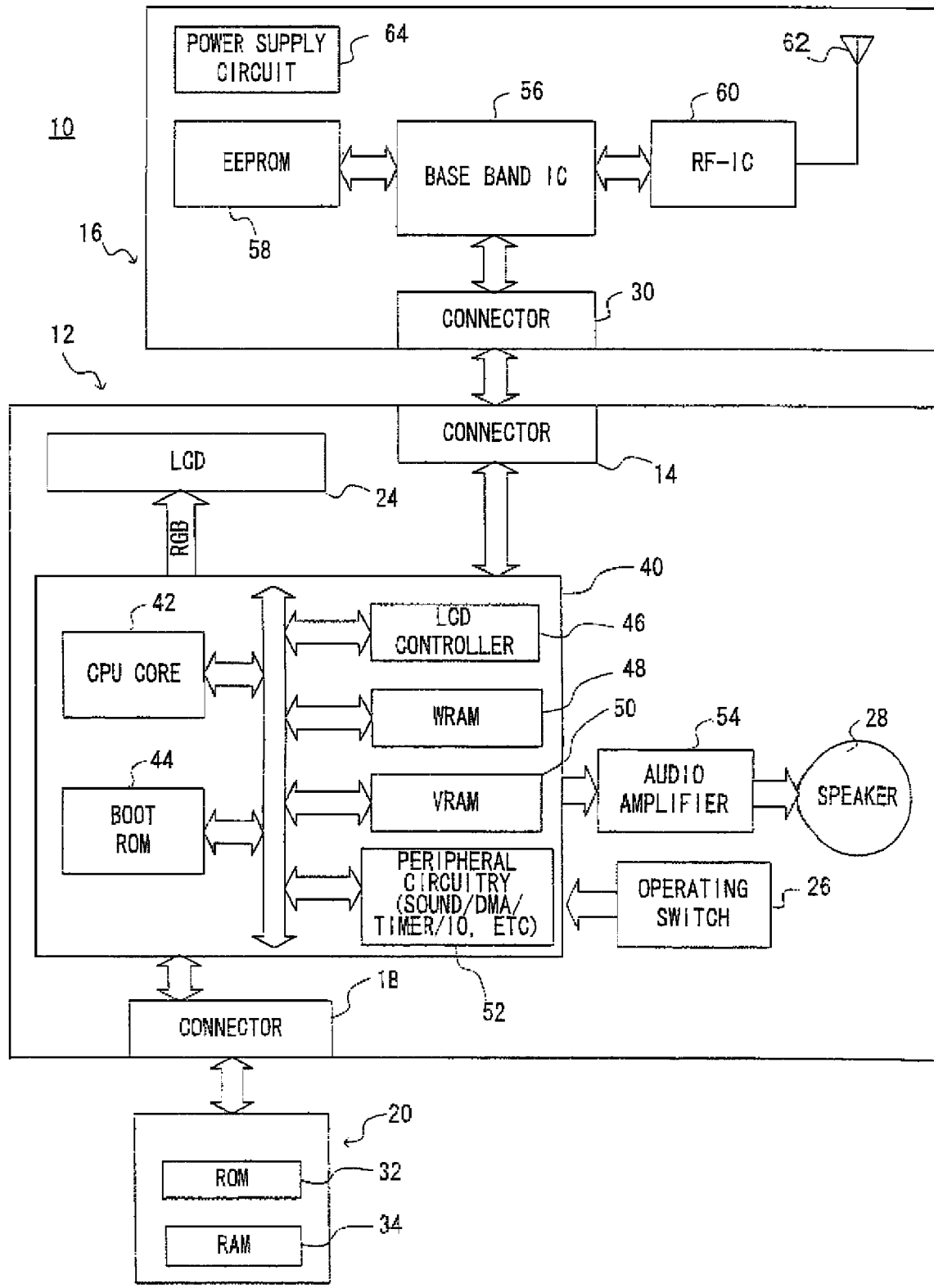
FIG. 2 is a block diagram showing one example of an internal structure of the game apparatus of FIG. 1.

FIG. 2 is a block diagram of the exemplary game apparatus 10. The game machine 12 includes a processor 40. The processor 40 includes a CPU core 42, a boot ROM 44, an LCD controller 46, a working RAM (WRAM) 48, a video RAM (VRAM) 50 and peripheral circuitry 52 related to the CPU core 42. Additionally, the peripheral circuitry 52 includes an audio (sound) circuit, a DMA (Direct Memory Access) circuit, a timer circuit, an input/output interface (TO), etc.

The processor 40 provides a display signal, or an RGB signal in this illustrative embodiment, to the LCD 24 which thus displays a game image in color. Also, the processor 40 outputs an audio signal to an audio amplifier 54, and, in response to the audio signal, the speaker 28 outputs such sounds as game music and sound effects. In addition, an operating signal from the operating switch 26 is input into the processor 40. Accordingly, the processor 40 performs a process under an operating instruction provided by the user or the player through the operating switch 26.

The cartridge 20 contains the ROM 32 and the backup RAM 34. The ROM 32 stores a game program and data for a game to be performed on the game machine 12 in advance, together with the name of the game (identification information on a game program), etc. The backup RAM 34 is intended to save in-progress game data and game result data, and stores such game data via the connector 18 in a rewritable and nonvolatile manner. Additionally, the backup RAM 34 may be composed of a flash memory, etc.

When the game machine 12 is powered on, the CPU core 42 executes a boot program stored in the boot ROM 44 to perform a process of starting the game machine 12. After that, the CPU core 42 executes a game program stored in the ROM 32 of the cartridge 20, and carries out a game process while storing temporary data generated by the execution of the program in the writable/readable WRAM 48. Additionally, image data generated by the CPU core 42 to execute the game program is rendered (stored) on the VRAM 50, and the image data stored in the VRAM 50 is output by the LCD controller 46 to the LCD 24. Also, the CPU core 42 generates data to be transmitted to another game apparatus in a predetermined area of the WRAM 48, and outputs it via the communication connector 14 to the wireless communication unit 16. Besides, data received from the other game apparatus 10 via the wireless communication unit 16 is processed in the CPU core 42 and temporarily stored in a predetermined area of the WRAM 48.

The wireless communication unit 16 communicates with the other game apparatus 10 by means of short-range radio, and includes a base band IC 56. The base band IC 56 includes a not illustrated ROM which contains OCD (One-Cartridge Download) program, for example, and other programs. The base band IC 56 operates in accordance with these programs.

Incidentally, the one-cartridge download program is a program for downloading a program, etc. to a child apparatus in OC mode (one-cartridge mode in which the parent apparatus alone has a game cartridge and the child apparatus operates upon downloading of programs and data for child apparatus from the cartridge of the parent apparatus).

The wireless communication unit 16 is further provided with an EEPROM 58 which uniquely stores the ID for this game apparatus itself and the name of the player input by the user. The base band IC 56 encodes data (programs, game data, etc.) transferred from the game machine 12 via the communication connector 14 and the connector 30 and data including the player's name, etc. from the EEPROM 58, and transmits them an RF (Radio Frequency)-IC 60. The RF-IC 60 modulates the data and transmits a radio wave from an antenna 62. Additionally, the radio field intensity is extremely low and set at a small value to such a degree that the user can use it without a license under the Radio Law. The wireless communication unit 16 is also provided with a power supply circuit 64. The power supply circuit 64 is typically a battery that supplies a direct-current power source to each component of the wireless communication unit 16.

In the wireless communication unit 16, a radio wave transmitted from the other hand-held game apparatus 10 is received by the antenna 62 and demodulated by the RF-IC 60, and then the demodulated signal is input into the base band IC 56. Thus, the base band IC 56 decodes the demodulated signal to reconstitute data, and transfers the data to the game machine 12, i.e., the WRAM 48 via the connector 40 and the communication connector 14.

The game system is composed of a plurality of game apparatus 10 as mentioned above. One of the plurality of game apparatus 10 plays a role as a parent apparatus and the other game apparatus plays a role as a child apparatus. That is, the game system includes the parent apparatus (a first game apparatus) and at least one child apparatus (a second game apparatus).

Figure 3:
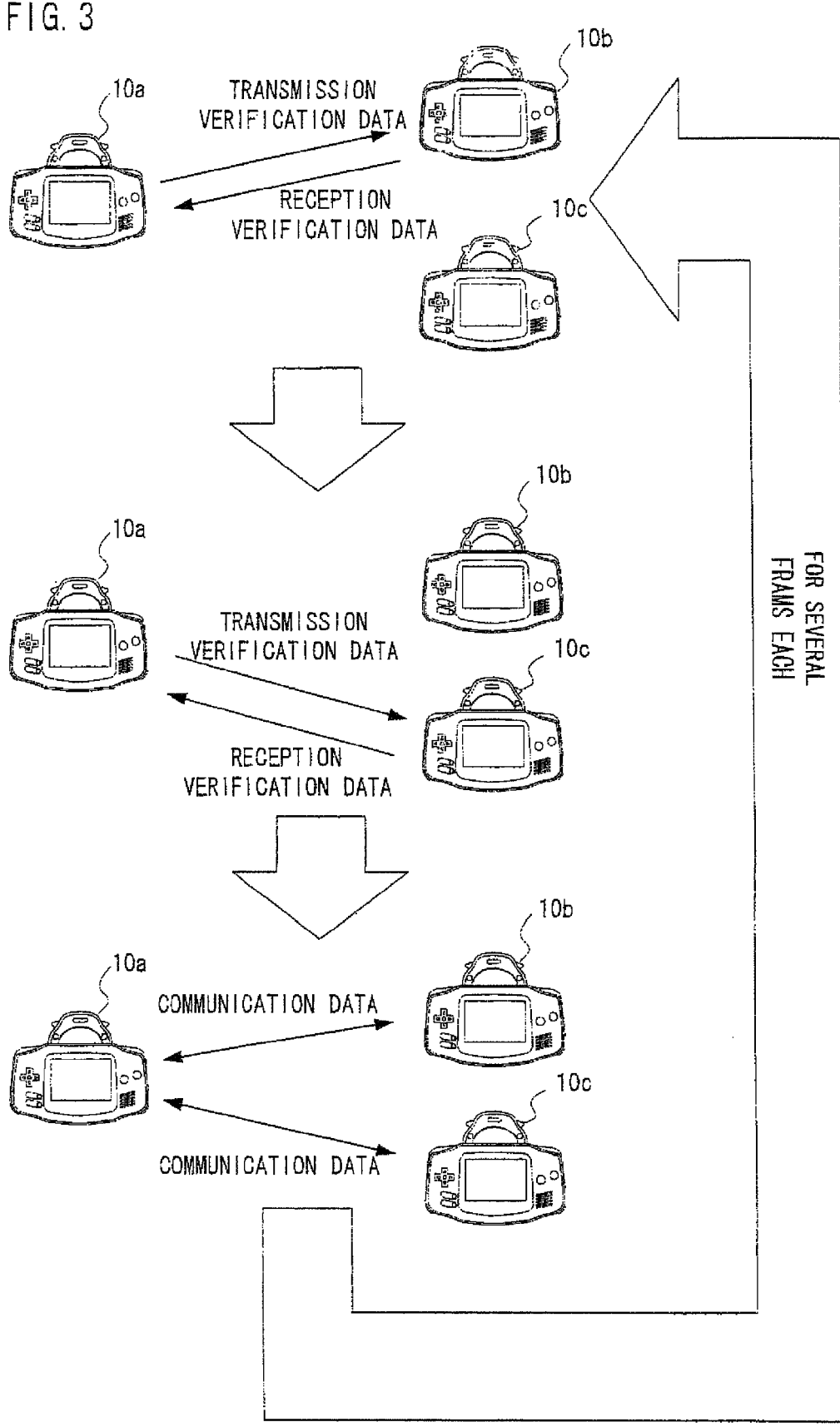
FIG. 3 is an illustrative view showing an outline of procedure of communication between game apparatus in this game system.

FIG. 3 shows one example of an outline of procedure for communication between the game apparatus 10 in the game system. In the example of FIG. 3, the game system includes three game apparatus 10a, 10b and 10c. The game apparatus 10a is the parent apparatus and the other game apparatus 10b and 10c are child apparatus. Connection for wireless communication between the parent apparatus 10a and the child apparatus 10b and 10c is established in advance of the communication game process.

As shown in FIG. 3, in performing the game process for the progress of the communication game, a communication state between the parent apparatus and each of the child apparatus is firstly verified. More specifically, the parent apparatus firstly transmits to one child apparatus (10b) transmission verification data for verifying the communication state a predetermined number of times (100 times, for example). That is, the parent apparatus transmits to the child apparatus a predetermined number of pieces of transmission verification data. Upon reception of the transmission verification data from the parent apparatus, the child apparatus transmits to the parent apparatus the same number of pieces of reception verification data as those of the received transmission verification data. For example, if it has received the transmission verification data 100 times, the child apparatus transmits the reception verification data to the parent apparatus 100 times. Incidentally, even though the transmission verification data is transmitted from the parent apparatus a predetermined number of times, some pieces of the transmission verification data may be not received by the child apparatus depending on the communication state. In this case, the child apparatus transmits a smaller number of pieces of the reception verification data than the predetermined number of pieces of the transmission verification data transmitted from the parent apparatus. Then, the parent apparatus receives the reception verification data from the child apparatus and detects the number of the received pieces of reception verification data (the number of the received pieces of data). Also, since some pieces of the reception verification data may not be received by the parent apparatus depending on the communication state, there is a possibility that the number of the received pieces of reception verification data may be smaller than those transmitted from the child apparatus. Subsequently, the parent apparatus also performs the communication state verification process on another child apparatus (10c) to detect the number of the received pieces of data for this child apparatus.

After the number of the received pieces of data is detected, the actual communication game process is performed between the parent apparatus and each of the child apparatus. More specifically, the parent apparatus varies the game process according to the detected number of the received pieces of data for each of the child apparatus. Also, the parent apparatus transmits to each of the child apparatus communication data including the number of the received pieces of data, information prepared on the basis of the number of the received pieces of data, game process results or the like. Each of the child apparatus transmits to the parent apparatus communication data including data required for the game process, and varies the game process according to the received number of the received pieces of data, etc.

The detected number of the received pieces of data indicates the communication state between the game apparatus and reflects the distance (positional relationship) between the parent apparatus and each of the child apparatus. That is, if the distance is short between the parent apparatus and the child apparatus, a communication error is relatively unlikely to occur and thus the detected number of the received pieces of data becomes large. On the contrary, if the distance between the parent apparatus and the child apparatus is long, a communication error is relatively likely to occur and thus the detected number of the received pieces of data becomes small. Therefore, in this game system, the game process is carried out according to the communication state between the game apparatus, that is, according to the actual positional relationship between the players. In addition, the number of the received pieces of data can be detected just by counting the number of the received pieces of reception verification data. This means that it is possible to detect the communication state between the game apparatus by performing the simple operation.

As stated above, the game is advanced by repeating the detection of the number of the received pieces of data in communication between the parent apparatus and each of the child apparatus and the game process based on the number of the received pieces of data in the parent apparatus or the child apparatus, for a predetermined number of frames each or for one frame each. If the number of the received pieces of data corresponding to any of the child apparatus is changed, the game process is performed according to the changed number of the received pieces of data.

In this game system, as an example, a communication game is performed in which items are exchanged between the parent apparatus and the child apparatus. In this case, the parent apparatus changes the priority rank of the communication game for each of the child apparatus according to the number of the received pieces of data, and, for example, decides the communication priority rank order in such a manner that the child apparatus is placed in a higher rank with a larger number of received pieces of data. Thus, it is possible to change the communication priority rank for each of the game apparatus 10 according to the detected number of the received pieces of data for each of the game apparatus 10, thereby providing a highly interesting communication game. Then, the parent apparatus transmits to each of the child apparatus the communication data including the information on the decided communication priority rank, and also carries out the game process according to the communication priority rank. Meanwhile, each of the child apparatus varies the game process according to the received priority rank. In addition, in the case where the number of the received pieces of data detected in communication with each of the child apparatus is changed with the progress of the game, the communication priority rank for each of the child apparatus is changed according to the changed number of the received pieces of data, and the game process is performed according to the priority rank order.

Moreover, a communication game is performed in which each player's player character appears in the game space, for example. In this case, the parent apparatus transmits the communication data, including the information on the number of the received pieces of data, to each of the child apparatus. Also, the parent apparatus changes the size of each of the player characters corresponding to each of the child apparatus, according to the number of the received pieces of data for each of the child apparatus. For example, the parent apparatus reduces the size of the player character with a smaller number of received pieces of data. In addition, each of the child apparatus varies the game process according to the number of the received pieces of data related to itself, for example, and reduces the size of the player character corresponding to the parent apparatus with a smaller number of received pieces of data, for example. Accordingly, the size of the player character displayed on the screen is changed according to the number of received pieces of data, which makes it possible to change the game details according to the number of received pieces of data.

Furthermore, the parent apparatus outputs such a sound as game music (BGM) that varies depending on the number of the received pieces of data. Also, each of the child apparatus outputs such a sound as BGM that varies depending on the number of the received pieces of data related to itself This allows the player to easily know whether the communication state of his game apparatus 10 is good or bad, from the output sound such as BGM.

Figure 4:
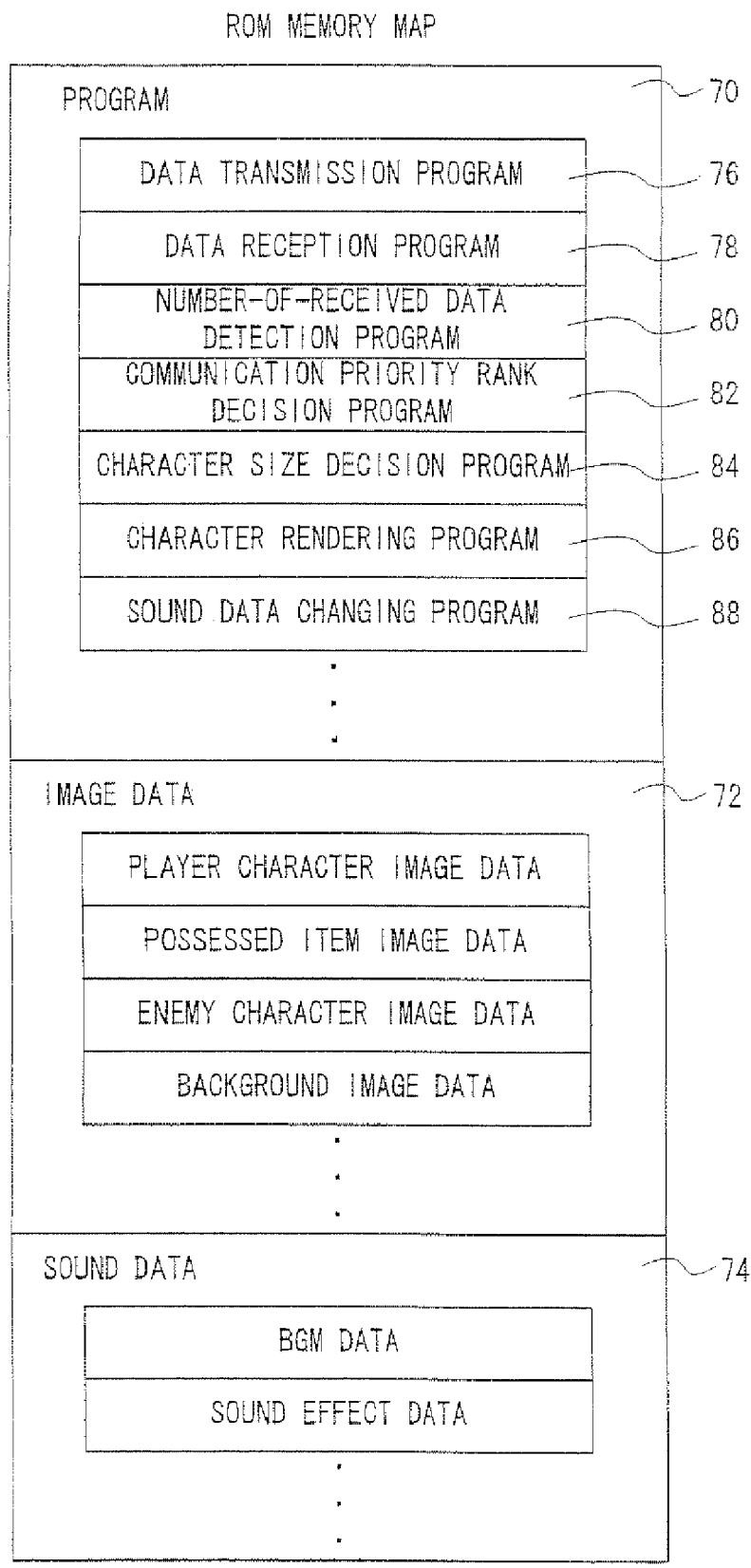
FIG. 4 is an illustrative view showing one example of memory map of a ROM in a cartridge.

FIG. 4 shows one example of memory map of a ROM 32 in a cartridge 20. The ROM 32 includes a program storage area 70, an image data storage area 72 and a sound data storage area 74. The program storage area 70 includes a data transmission program storage area 76, a data reception program storage area 78, a number-of-received data detection program storage area 80, a communication priority rank decision program storage area 82, a character size decision program storage area 84, a character rendering program storage area 86, a sound data changing program storage area 88, etc.

The data transmission program storage area 76 stores a program for transmitting data to another game apparatus 10. For example, with this program, the parent apparatus transmits the transmission verification data to the child apparatus a predetermined number of times, and also transmits the communication data required for the game process to the child apparatus. Meanwhile, the child apparatus transmits the same number of pieces of reception verification data as those of the transmission verification data from the parent apparatus to the parent apparatus, and also transmits the communication data required for the game process to the parent apparatus.

The data reception program storage area 78 stores a program for receiving data from another game apparatus 10. For example, with this program, the parent apparatus receives the reception verification data and the communication data from the child apparatus. Meanwhile, the child apparatus receives the transmission verification data and the communication data from the parent apparatus. The received data is temporarily stored in a predetermined area of the WRAM 48.

The number-of-received data detection program storage area 80 stores a program for the parent apparatus to detect the number of the received pieces of reception verification data transmitted from each of the child apparatus. As stated above, the communication state with each of the child apparatus is recognized by the number of the received pieces of data.

The communication priority rank decision program storage area 82 stores a program for the parent apparatus to decide the communication priority rank order for the item exchange game, for example, based on the number of the received pieces of data for each of the child apparatus. For instance, each of the child apparatus is given a rank in descending order of the detected number of received pieces of data. Thus, the communication priority rank order can be changed according to the number of the received pieces of data for each of the child apparatus, which means that it is possible to make the game more interesting.

The character size decision program storage area 84 stores a program for, in a game where a plurality of player characters corresponding to the game apparatus 10 appear in the virtual game space, deciding the sizes of the player characters displayed on the screen, based on the number of received pieces of data. With this program, the parent apparatus decides the size of at least one of the player character corresponding to each of the child apparatus and the player character corresponding to the parent apparatus itself, based on the number of the received pieces of data for each of the child apparatus. In addition, the child apparatus decides the size of at least one of the player character corresponding to the parent apparatus and the player character corresponding to itself or another child apparatus, based on the number of the received pieces of data detected by the parent apparatus in communication with itself or the other child apparatus. More specifically, the size of the player character corresponding to the child apparatus or the parent apparatus is reduced on the game screen as the number of the received pieces of data is smaller. The size of the player character, for example, may be decided by means of table data including the size data of the player character associated with the value of the number of the received pieces of data, or may be calculated according to the value of the number of the received pieces of data with reference to the size of this game apparatus's own player character. This program makes it possible to change the sense of distance between the player characters in the virtual game space according to the quality of the communication state with the partner player's game apparatus 10, resulting in enhancement of the game's interesting characteristics.

The character rendering program storage area 86 stores a program for rendering an image of a character. With this program, the image of a player character of a size decided on the basis of the number of the received pieces of data and the images of other characters (enemy characters, etc.)are rendered.

The sound data changing program storage area 88 stores a program for changing sound data according to the number of received pieces of data. With this program, such sound data as game music or BGM to be output is changed according to the number of received pieces of data. For example, the parent apparatus decides the sound data to be used for output from among a plurality of BGM sounds, based on the total or average of the numbers of received pieces of data for each of—the child apparatus, or based on the maximum or minimum number of received pieces of data, etc. Meanwhile, the child apparatus, for example, decides the sound data to be used for output from among a plurality of BGM sounds, based on the number of received pieces of data detected by the parent apparatus in communication with the child apparatus. Alternatively, the parent apparatus and the child apparatus may change the contents of the sound data to be output by changing or increasing/decreasing the track to be reproduced out of the sound data or by changing the tones, based on the number of received pieces of data. Thus, from the output sound, the player can easily know whether the communication state between the game apparatus 10 is good or bad.

Besides, the program storage area 70 stores various programs required for the progress of the game, although not illustrated, such as a program for displaying a rendered image on the LCD 24 and a program for outputting a sound from the speaker 28.

Moreover, the image data storage area 72 stores image data for generating a game screen such as player character image data, possessed item image data, enemy character image data, and background image data. The CPU core 42 renders a game image in the VRAM 50 based on the image data.

Furthermore, the sound data storage area 74 stores a plurality of pieces of sound data for outputting sounds including game music (BGM), sound effects and voices, such as BGM data and sound effect data. The CPU core 42 generates an audio signal to be output by means of the sound circuit, etc. based on the sound data, etc.

Figure 5:
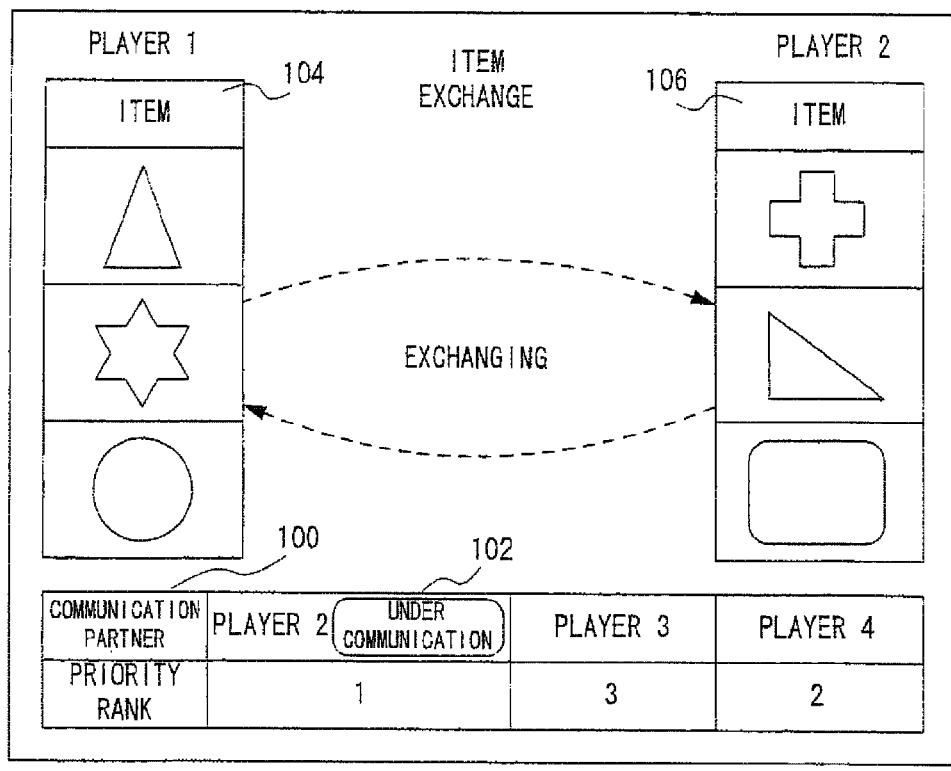
FIG. 5 is an illustrative view showing one example of game screen at a time of item exchange which is displayed on the parent apparatus.

FIG. 5 shows one example of a game screen displayed on the parent apparatus in exchanging items in this game system. In the example of FIG. 5, the game system includes four game apparatus 10. The parent apparatus is operated by a player 1, and the three child apparatus are operated by players 2, 3 and 4, respectively. In correspondence with the game screen of FIG. 5, FIG. 6 and FIG. 7 each show one example of a game screen displayed on the child apparatus.

Figures 8, 9:
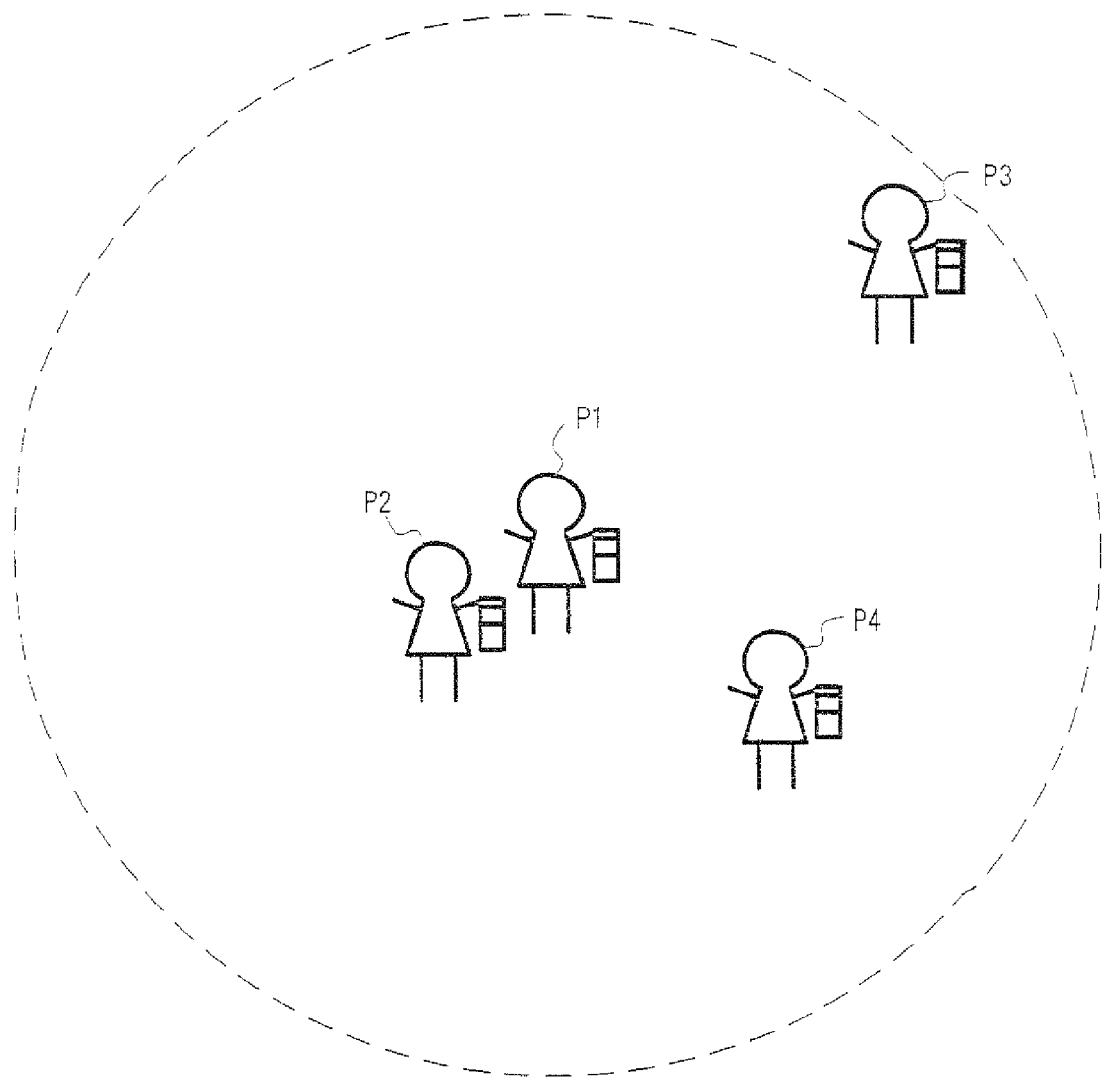
FIG. 8 is an illustrative view showing one example of positional relationships among the players corresponding to FIGS. 5 to 7.
FIG. 9 is an illustrative view showing one example of contents of parent communication data transmitted from the parent apparatus.

A priority rank display portion 100 is provided in a lower part of the game screen of FIG. 5. The priority rank display portion 100 displays a communication partner and the communication priority rank given to the communication partner. In this example, the priority rank of the player 2 is the first, the rank of the player 3 is the third and the rank of the player 4 is the second. FIG. 8 shows positional relationships among the players corresponding to the communication ranks shown in FIG. 5. In FIG. 8, the players 1 to 4 are shown with reference numerals P1 to P4, and the circle indicated by a dotted line denotes a communicable range of the parent apparatus. As shown in FIG. 8, the communication priority rank reflects the actual distance between the player 1 of the parent apparatus and each of the players 2 to 4 of the child apparatus. That is, these players of the child apparatus exist near the player 1, in descending order of the player 2, the player 4 and the player 3 according to the communication priority rank.

Returning to FIG. 5, the priority rank display portion 100 displays in the section of the player 2 in the first rank of the communication priority an icon 102 indicating that the parent apparatus is in the process of playing a communication game with the child apparatus of the player 2. Also, provided at left and right ends of the game screen are an item display portion 104 for displaying items possessed by the player of this apparatus itself and an item display portion 106 for displaying items possessed by the player of the communication partner apparatus, respectively. That is, the item display portion 104 on the left side displays three selected ones of the items possessed by the player 1 of the parent apparatus, and the item display portion 106 on the right side displays three selected ones of the items possessed by the player 2 of the child apparatus in the process of playing a communication game. The player can operate the direction switch 26a, for example, to change the item displayed in the item display portion by scrolling through the possessed items. In this illustrative embodiment, the items displayed in the middle of the item display portions 104 and 106 are to be exchanged with each other. The player operates a predetermined operating switch 26 (the A button 26b, for example) to decide his own item to be exchanged with the communication partner's one. Item exchange is performed when the both players operate a predetermined operating switch 26. The example of FIG. 5 indicates that the items are being exchanged. Incidentally, the child apparatus as a communication partner transmits information on the communication partner's possessed items displayed on the item display portion 106 and information indicating that the communication partner has decided the item to be exchanged.

Figure 6:
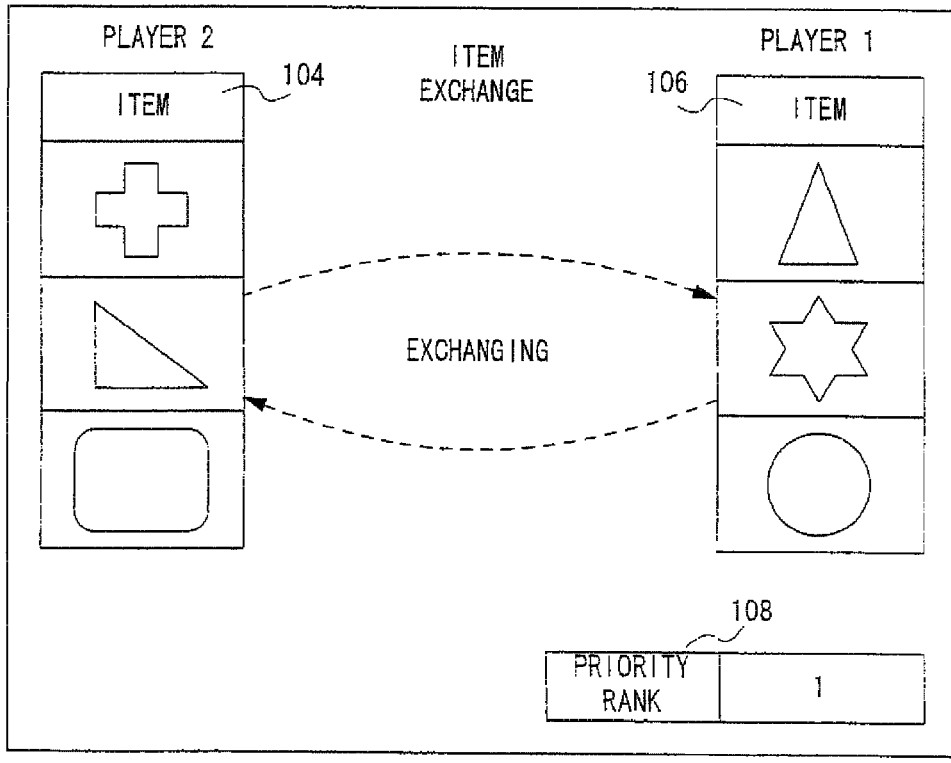
FIG. 6 is an illustrative view showing one example of game screen at a time of item exchange which is displayed on the child apparatus in a first communication priority rank.

FIG. 6 shows one example of a game screen displayed on the child apparatus of the player 2 in the process of playing a communication game with the parent apparatus. The game screen of FIG. 6 corresponds to the game screen of the parent apparatus shown in FIG. 5. That is, the child apparatus of the player 2 is in the first communication priority rank and is playing the communication game with the parent apparatus. A priority rank display portion 108 provided in a right lower part of the screen of FIG. 6 displays the communication priority rank of the child apparatus. The priority rank display portion 108 makes it possible to inform the communication priority rank to the player of the child apparatus. By learning his communication priority rank, the player can easily know whether the communication state of his game apparatus 10 is good or bad in comparison with other players' game apparatus 10.

In addition, the player's own item display portion 104 and the partner's item display portion 106 are provided at the left and right ends of the screen, respectively. That is, the item display portion 104 displays three selected items possessed by the player 2, and the item display portion 106 displays three selected items possessed by the player 1 of the parent apparatus. The player's own item display portion 104 and the partner's item display portion 106 shown in FIG. 6 display the same items as those displayed in the partner's item display portion 106 and the player's own item display portion 104 shown in FIG. 5, respectively. As well as FIG. 5, FIG. 6 indicates that the items are being exchanged. The parent apparatus, as a communication partner, transmits information on the priority rank, information on the communication partner's possessed items displayed in the item display portion 106, and information indicating that the communication partner has decided on which item to be exchanged.

Figure 7:
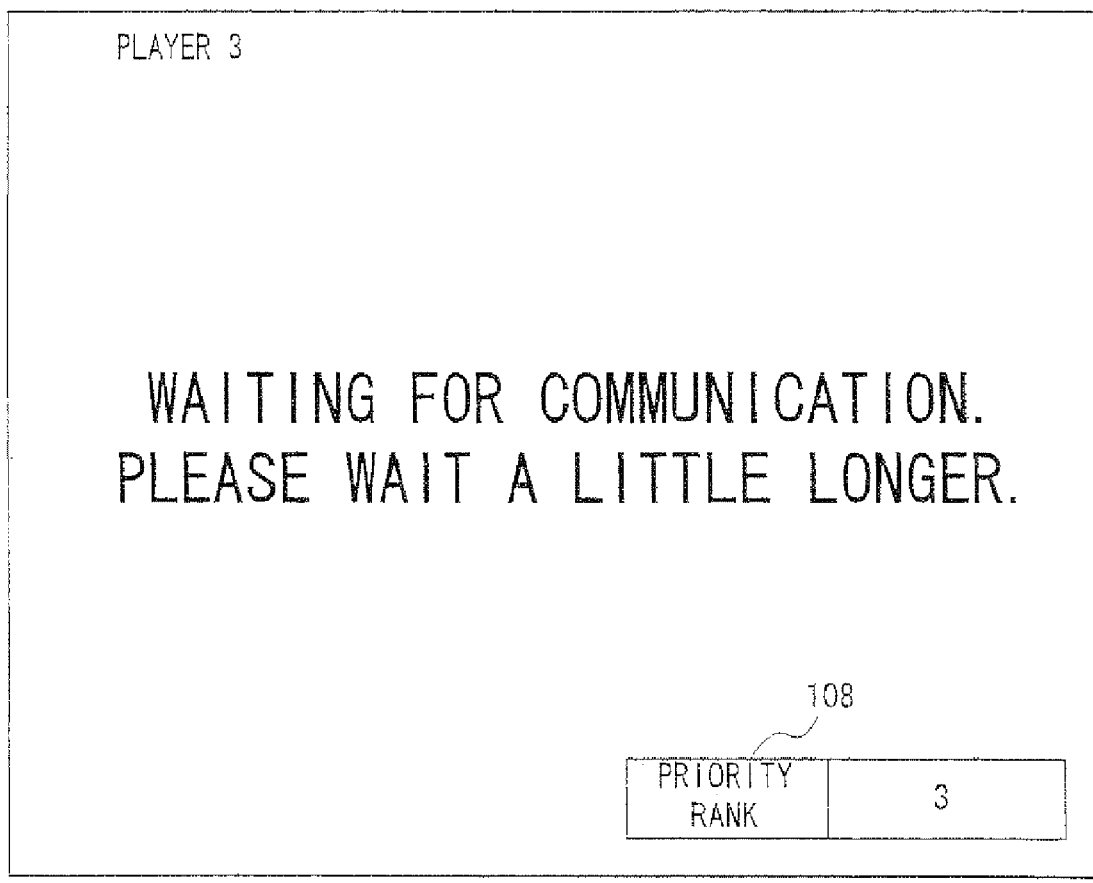
FIG. 7 is an illustrative view showing one example of game screen at a time of item exchange which is displayed on the child apparatus in a lower communication priority rank.

FIG. 7 shows one example of a game screen displayed on the child apparatus of the player 3 in a state of waiting for a communication game with the parent apparatus. The game screen of FIG. 7 corresponds to the game screen of FIG. 5. That is, the child apparatus of the player 3 is in the third communication priority rank and is not playing a communication game with the parent apparatus. The priority rank display portion 108 provided in the right lower part of the screen of FIG. 7 displays the communication priority rank of the child apparatus. Additionally, a message indicative of a state waiting for playing the communication game is displayed in the center of the screen in the form of text such as "Waiting for communication. Please wait a little longer." or some picture, etc. The parent apparatus transmits the information on the priority rank, etc. As stated above, each of the players of the game apparatus 10 that are not in the top communication priority rank can learn that his own game apparatus is not in the process of a communication game with the parent apparatus and also know whether the communication state of his own game apparatus 10 is good or bad in comparison with the other players' game apparatus 10.

FIG. 9 shows one example of contents of communication data transmitted from the parent apparatus (hereinafter referred to as "parent communication data"). The parent communication data is transmitted by the parent apparatus to each of the child apparatus after deciding the communication ranks based on the number of the received pieces of data. The parent communication data of FIG. 9 contains communication priority rank data indicative of the information on the communication priority rank. Set in the communication priority rank data are the communication priority ranks of the child apparatus connected with the parent apparatus. Each of the child apparatus obtains its own priority rank from the received communication priority rank data, and displays it in the priority rank display portion 108 of the game screen.

Figure 10:
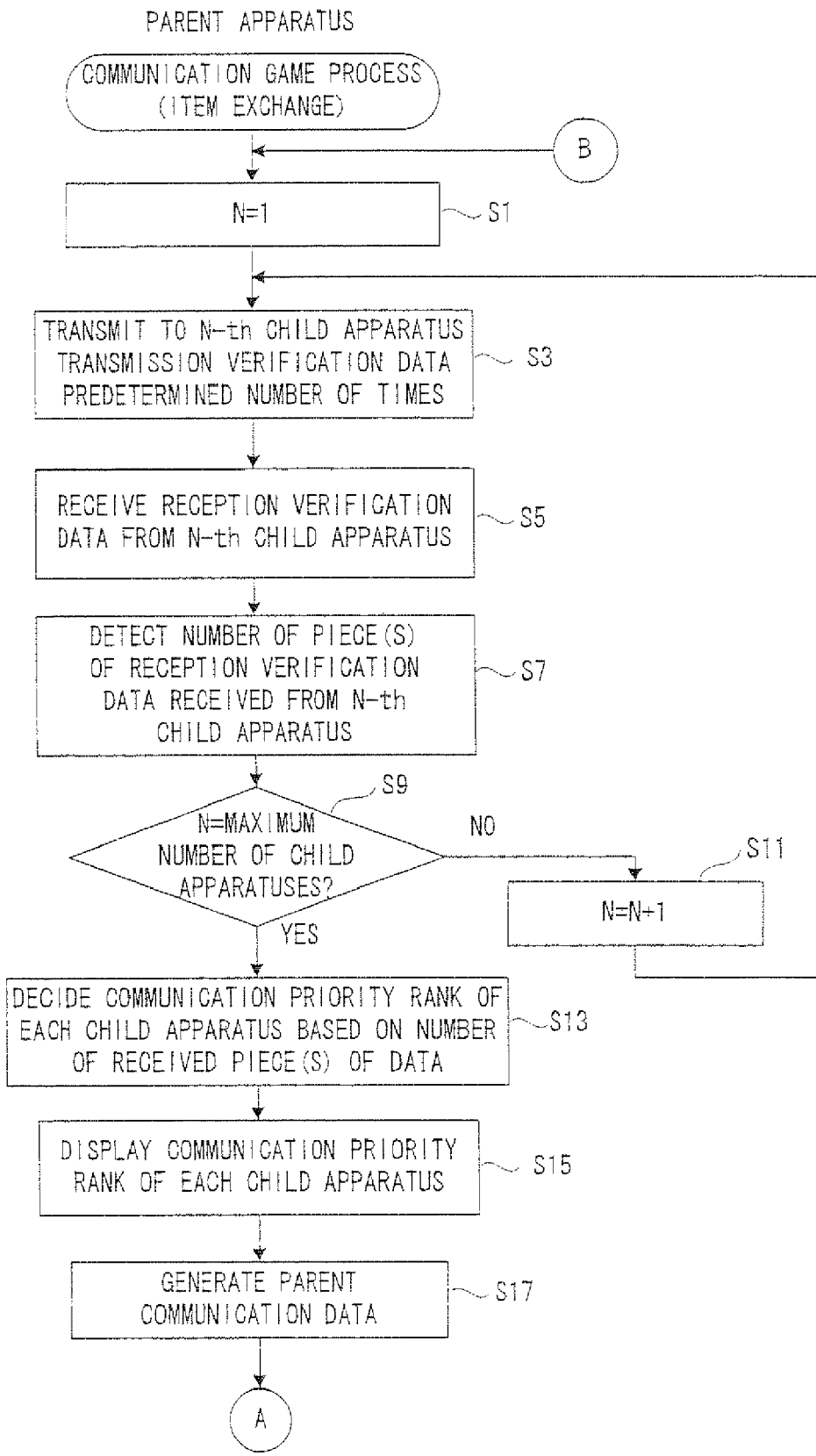
FIG. 10 is a flowchart showing one example of operation of communication game process in the parent apparatus at a time of item exchange.

FIG. 10 shows one example of operation of communication game process of the parent apparatus during the item exchange game in this game system. In a first step 51 of FIG. 10, the CPU core 42 of the parent apparatus sets a variable N to an initial value "1". Next, in a step S39, the CPU core 42 transmits to an N-th child apparatus transmission verification data for verifying the communication state a predetermined number of times, via the wireless communication unit 16. Following that, in a step S5, the CPU core 42 receives reception verification data from the N-th child apparatus as a destination of the transmission verification data, via the wireless communication unit 16. Then, in a step S7, the CPU core 42 detects the number of the received pieces of data of reception verification data received from the N-th child apparatus in the step S5, and stores the detected number of the received pieces of data in a predetermined area of the WRAM 48, in association with the identifier, etc. of the N-th child apparatus.

In a step S9, the CPU core 42 determines whether or not the value of the variable N is equal to the maximum number of child apparatus, for example. The maximum number of child apparatus is the number of the child apparatus of which connections with the parent apparatus are established by means of wireless communication. That is, in the step S9, it is determined whether or not the detection of the number of the received pieces of data is completed with regard to all the child apparatus. If "NO" in the step S9, the CPU core 42 adds "1" to the variable N in a succeeding step S11 and returns to the step S3.

On the other hand, if "YES" in the step S9, the CPU core 42 decides in a step S13 the communication priority rank of each of the child apparatus based on the number of the received pieces of data detected in communication with each of the child apparatus. Subsequently, in a step S15, the CPU core 42 performs a process of displaying the communication priority rank of each of the child apparatus. With this, as shown in FIG. 5 for example, the image of a game screen with the communication priority rank of each of the child apparatus displayed in the priority rank display portion 100 is rendered in the VRAM 50, and then the game screen is displayed on the LCD 24 by means of the LCD controller 46.

Figure 11:
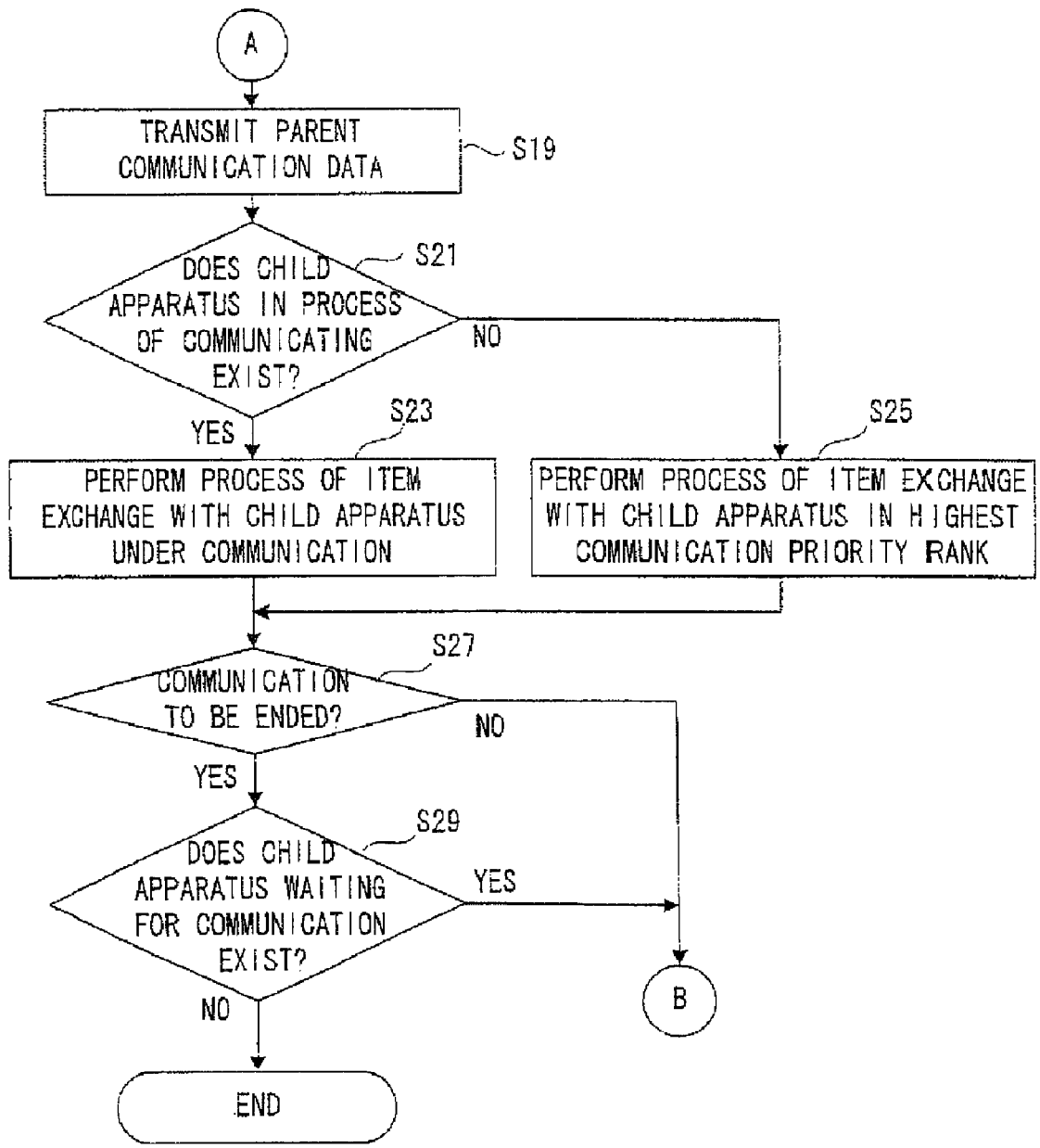
FIG. 11 is a flowchart continued from FIG. 10.

In a step S17, the CPU core 42 generates the parent communication data. Accordingly, the parent communication data containing the communication priority rank of each of the child apparatus is prepared as shown in FIG. 9. Then, in a next step S19 of FIG. 11, the CPU core 42 transmits the parent apparatus data to each of the child apparatus via the wireless communication unit 16.

Subsequently, in a step S21, the CPU core 42 determines whether or not there exists any child apparatus in the process of communication. If "YES" in the step S21, the CPU core 42 performs a process of exchanging items with the child apparatus under communication. On the contrary, if "NO" in the step S21, the CPU core 42 performs a process of exchanging items with the child apparatus in the highest communication priority rank, based on the communication priority rank order decided in the step S13. In the item exchange process of the parent apparatus, operational input data from the operating switch 26 of the parent apparatus is obtained and the communication data including data required for the progress of the game is transmitted to the child apparatus in the process of playing the communication game. Then, as shown in FIG. 5, for example, a game screen showing the item exchange based on the operational data input from the parent apparatus and the communication data from the child apparatus is generated in the VRAM 50 and displayed on the LCD 24.

In a succeeding step S27, the CPU core 42 determines whether or not to end the communication with the child apparatus with which the parent apparatus is now communicating. For example, if the item exchange with the child apparatus is completed or if an instruction for the end of the item exchange is issued by the player operating a predetermined operating switch 26, the CPU core 42 determines that the communication is to be ended. If "NO" in the step S27, that is, if the communication with the child apparatus is to be continued, the CPU core 42 returns to the step S1 of FIG. 1 to repeat the processes.

On the other hand, if "YES" in the step S27, the CPU core 42 determines in a succeeding step S29 whether or not there exists any child apparatus in a state of waiting for communication. If "YES" in the step S29, that is, if there exists a child apparatus not in the first communication priority rank, the CPU core 42 returns to the step S1 of FIG. 10 to repeat the processes. In contrast, if "NO" in the step S29, the CPU core 42 ends this communication game process.

Figure 12:
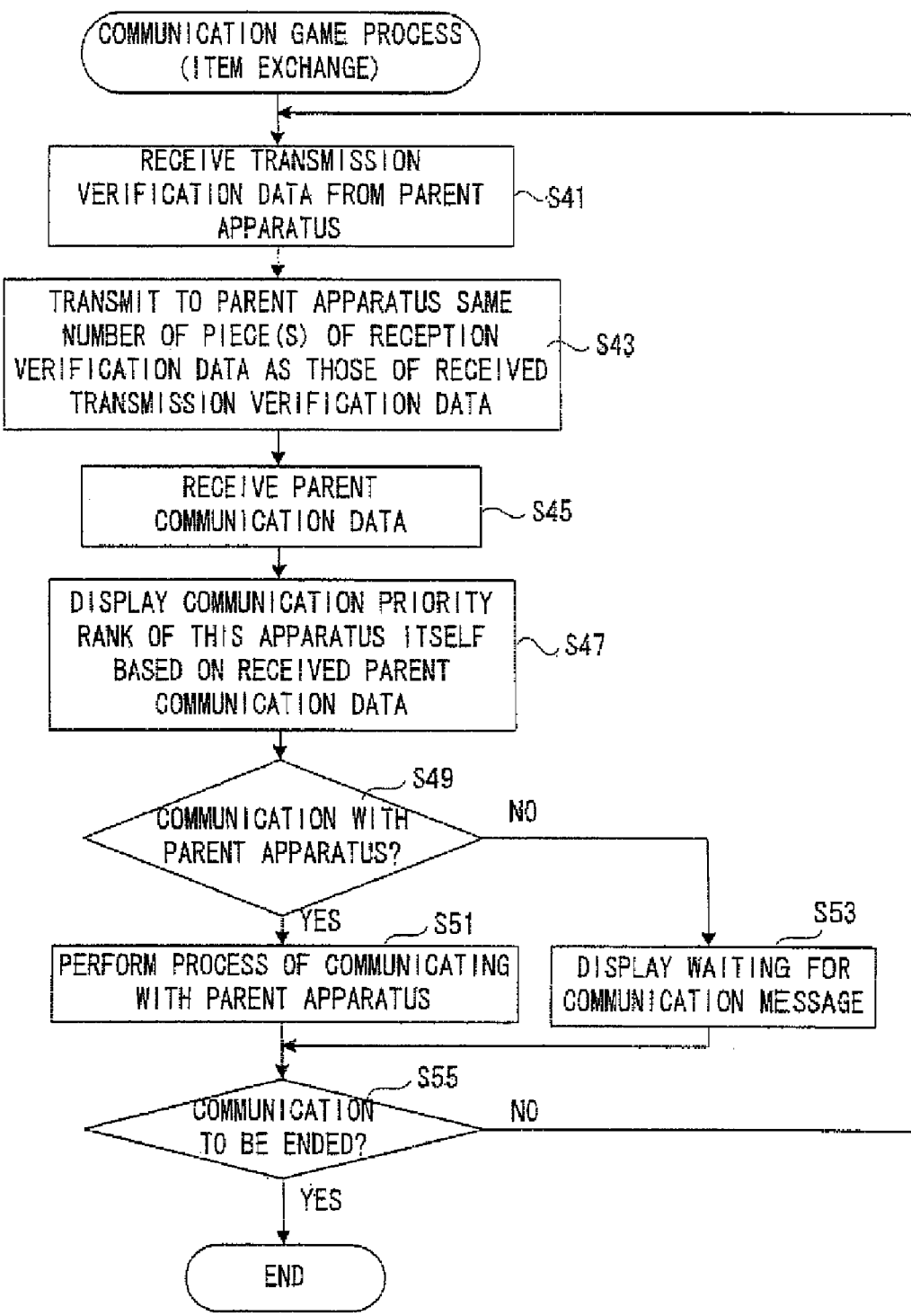
FIG. 12 is a flowchart showing one example of operation of communication game process in the child apparatus at a time of item exchange.

FIG. 12 shows one example of operation of communication game process of the child apparatus during the item exchange game in this game system. In a first step S41 of FIG. 12, the CPU core 42 of the child apparatus receives transmission verification data from the parent apparatus via the wireless communication unit 16. Since the parent apparatus has transmitted a predetermined number of pieces of transmission verification data, the child apparatus receives the transmission verification data transmitted from the parent apparatus and detects the number of the received pieces of transmission verification data.

Next, in a step S43, the CPU core 42 transmits to the parent apparatus the same number of pieces of reception verification data as those of the received pieces of transmission verification data, via the wireless communication unit 16.

Following that, in a step S45, the CPU core 42 receives the parent communication data transmitted from the parent apparatus. The parent communication data from the parent apparatus includes the priority rank data of each of the child apparatus, as shown in FIG. 9.

Then, in a step S47, the CPU core 42 performs a process of displaying the communication priority rank of this child apparatus' own based on the received parent communication data. With this, as shown in FIG. 6 or FIG. 7, for example, the image of a game screen displaying the communication priority rank of the child apparatus in the priority rank display portion 108 is rendered in the VRAM 50 and the game screen is displayed on the LCD 24 by means of the LCD controller 46.

In a step S49, the CPU core 42 determines whether or not to communicate with the parent apparatus. That is, for example, the CPU core 42 determines whether or not this child apparatus itself is in the first communication priority rank, or whether this child apparatus is in the process of communicating with the parent apparatus. If "YES" in the step S49, that is, if the communication game is to be played with the parent apparatus, the CPU core 42 performs a process of communicating with the parent apparatus, i.e. a process of exchanging items in a step S51. In this process, the CPU core 42 obtains operational input data from the operating switch 26 of the child apparatus, and transmits to the parent apparatus the communication data including the data required for the progress of the game. Then, as shown in FIG. 6, for example, a game screen indicating the item exchange based on the operational input data from the child apparatus and the communication data from the parent apparatus is generated in the VRAM 50 and displayed on the LCD 24.

On the other hand, if "NO" in the step S49, that is, if the communication game cannot be played with the parent apparatus, the CPU core 42 carries out a process of displaying a state of waiting for communication in a step S53. By this process, as shown in FIG. 7, for example, a game screen that indicates a state of waiting for communication is generated in the VRAM 50 and displayed on the LCD 24.

Subsequently, in a step S55, the CPU core 42 determines whether or not to end the communication with the parent apparatus. For example, when the item exchange with the parent apparatus is completed or when an instruction for the end of the item exchange with the parent apparatus is issued by the player operating a predetermined operating switch 26, the CPU core 42 determines that the communication is to be ended. If "NO" in the step S55, that is, if the communication with the parent apparatus is to be continued, the CPU core 42 returns to the step S41 to repeat the processes. On the other hand, if "YES" in the step S55, the CPU core 42 ends this communication game process.

Figure 13:
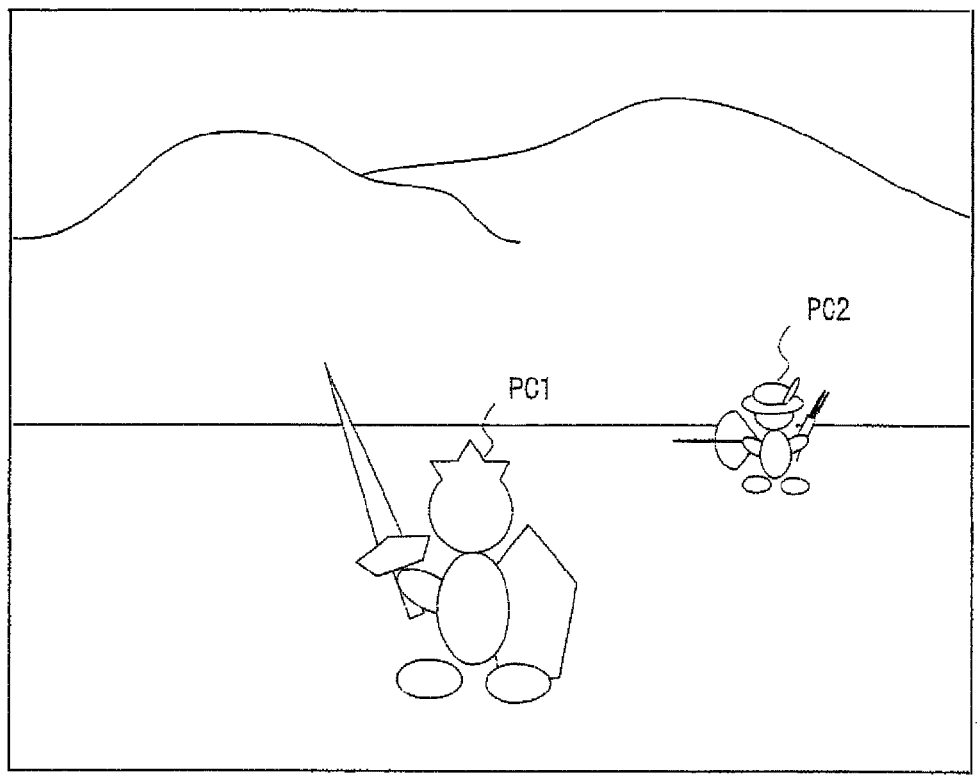
FIG. 13 is an illustrative view showing one example of game screen during a battle game displayed on the parent apparatus.
Figure 14:
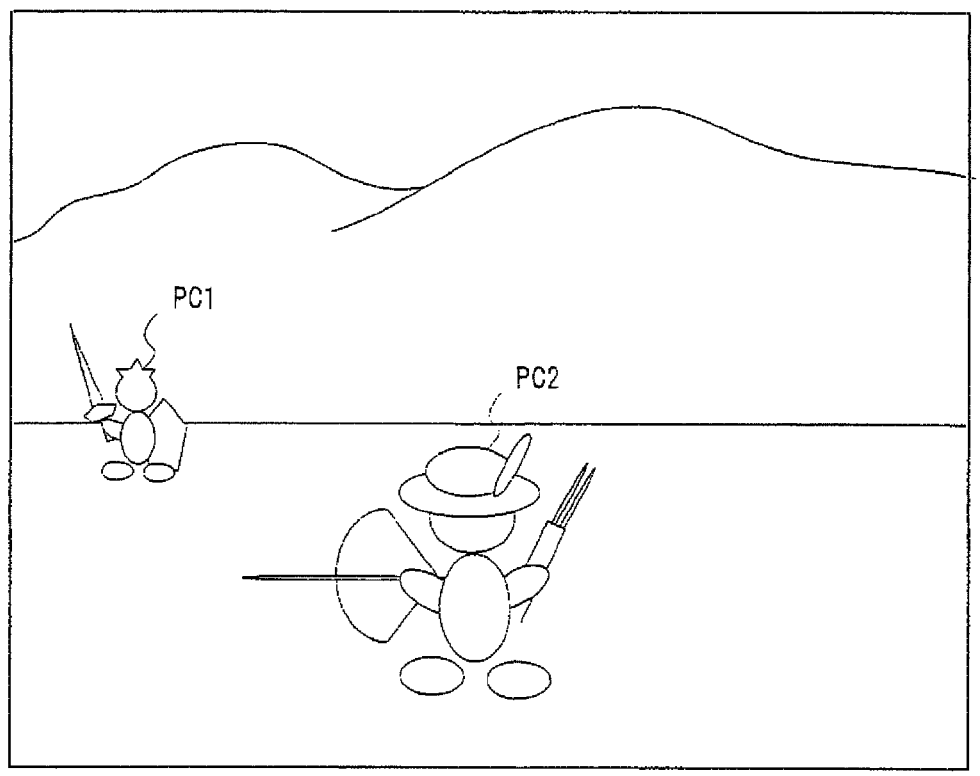
FIG. 14 is an illustrative view showing one example of game screen during a battle game displayed on the child apparatus.

FIG. 13 shows one example of a game screen displayed on the parent apparatus in performing a battle game in this game system. In the example of FIG. 13, the game system includes two game apparatus 10. The parent apparatus is operated by the player 1, and the child apparatus is operated by the player 2. In correspondence with the game screen of the parent apparatus of FIG. 13, FIG. 14 shows one example of a game screen displayed on the child apparatus. Also, FIG. 15 indicates a positional relationship between the players corresponding to FIG. 13 and FIG. 14.

As shown in FIG. 13 and FIG. 14, the game screens each display a part or the whole of the virtual game space containing a player character PC1 operated by the player 1 of the parent apparatus and a player character PC2 operated by the player 2 of the child apparatus.

The player character PC1 corresponding to the parent apparatus of FIG. 13 is displayed on the game screen in the approximate center and the player character PC2 corresponding to the child apparatus as a communication partner is displayed on the right side. The child apparatus transmits information on the position of the player character PC2 of the child apparatus. In this illustrative embodiment, the parent apparatus changes the size of the player character corresponding to each child character, based on the number of received pieces of data for the child character. For example, the size of the player character of the child apparatus displayed on the screen is reduced with a smaller number of received pieces of data, and is increased with a larger number of received pieces of data. The more data that is received, the closer in size the child character becomes to the size of the player character PC1 of this parent apparatus itself.

Additionally, the player character PC2 corresponding to this child apparatus of FIG. 14 is displayed in the approximate center of the child apparatus screen and the player character PC1 corresponding to the parent apparatus as a communication partner is displayed on the left side. Also, in this illustrative embodiment, the child apparatus changes the size of the player character PC1 corresponding to the parent apparatus based on the number of received pieces of data for the parent apparatus. For example, the size of the player character PC1 of the parent apparatus displayed on the screen is reduced with a smaller number of received pieces of data, and is increased with a larger number of received pieces of data. The more data that is received, the closer in size the parent character becomes to the size of the player character PC2 of this child apparatus itself. The parent apparatus also transmits information on the position of the player character PC1 of the parent apparatus and information on the number of the received pieces of data for the child apparatus.

Figure 15:
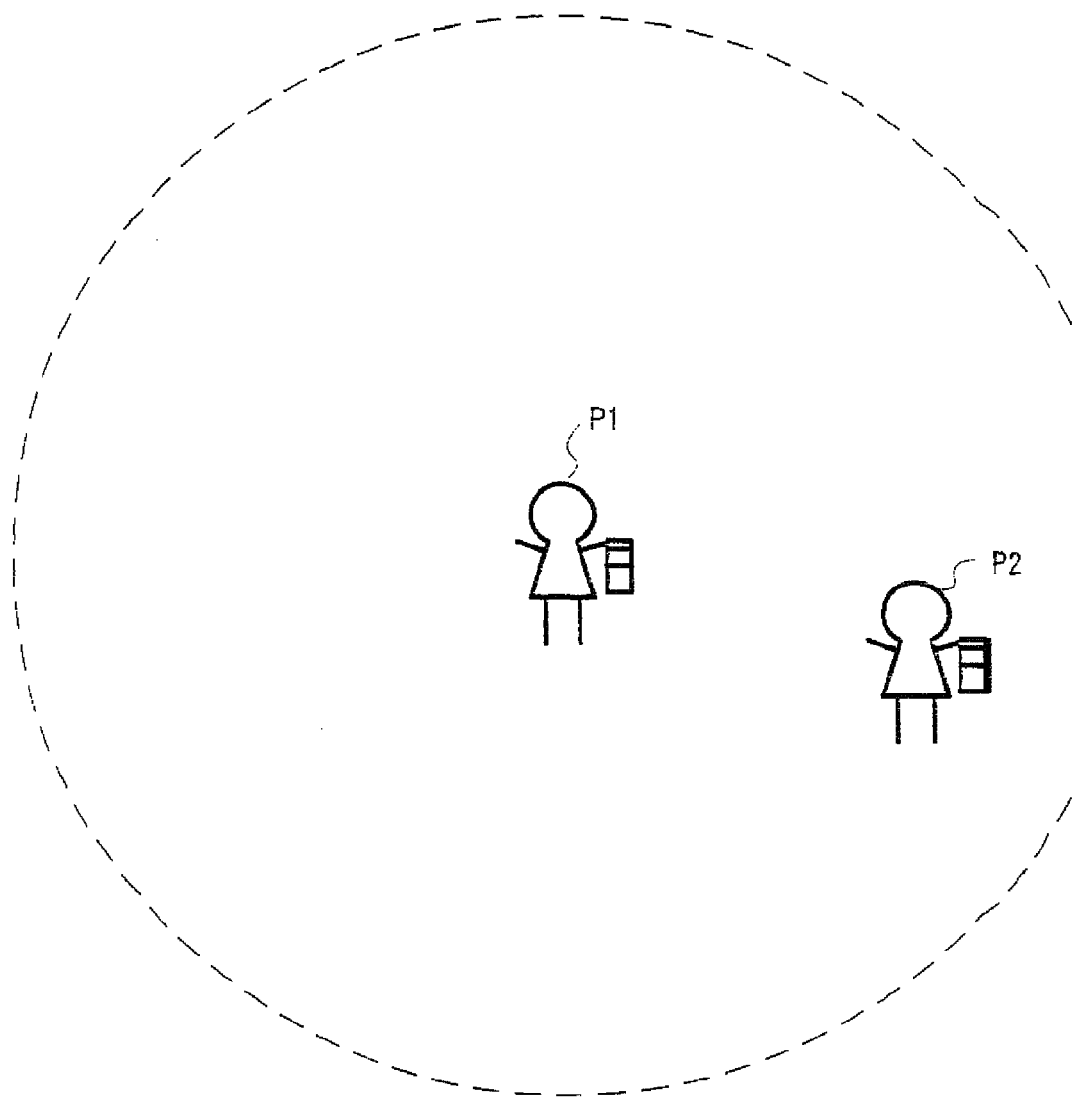
FIG. 15 is an illustrative view showing one example of positional relationship between the players corresponding to FIGS. 13 and 14.

In FIG. 15 showing the actual positional relationship between the players, the players 1 and 2 are indicated with the reference numerals P1 and P2, and the circle shown by a dotted line denotes a communicable area for the parent apparatus of the player 1. As seen from FIG. 15, the sense of distance between the player characters on the game screens shown in FIG. 13 and FIG. 14 reflects the actual distance between the player 1 of the parent apparatus and the player 2 of the child apparatus. That is, as shown in FIG. 15, since the player 1 and the player 2 exist at locations relatively distant from each other, the displayed game screen shows the virtual game space in which these player characters are also located at positions relatively distant from each other.

Also, although not expressed on the game screens of FIG. 13 and FIG. 14, the parent apparatus and each of the child apparatus change a sound to be output depending on the number of received pieces of data. For example, the parent apparatus changes sound data for BGM to be output, based on the detected number of received pieces of data for each of the child apparatus. Also, the child apparatus changes sound data for BGM to be output, based on the number of received pieces of data corresponding to the child apparatus itself, which has been transmitted from the parent apparatus. Therefore, the output BGM varies depending on the actual distance or positional relationship between the players.

FIG. 16 (A) shows one example of contents of communication data transmitted from the child apparatus to the parent apparatus (hereinafter referred to as "child communication data"). The child communication data includes position data in the game space of the player character (the i-th player character) of this child apparatus itself (the i-th child apparatus) (i is a positive integer). The parent apparatus decides the position of the i-th player character corresponding to the i-th child apparatus in the game space of the parent apparatus, based on the position data included in the received child communication data.

In addition, FIG. 16(B) shows one example of contents of parent communication data transmitted from the parent apparatus to each child apparatus. The parent communication data includes position data and data on number-of-received data. The position data includes information on the positions of the player character of the parent apparatus and the player character of each of the child apparatus in the game space. The data on number-of-received data includes information on the number of received pieces of data for each of the child apparatus, which is detected by the parent apparatus. Each of the child apparatus decides the position of each of the player characters in the game space of the child apparatus' own, based on the received position data. Also, each of the child apparatus changes the size of the player character of the parent apparatus or the player character of another child apparatus, and the BGM to be output, based on the received data on number-of-received data corresponding to the child apparatus itself or the other child apparatus.

Figure 17:
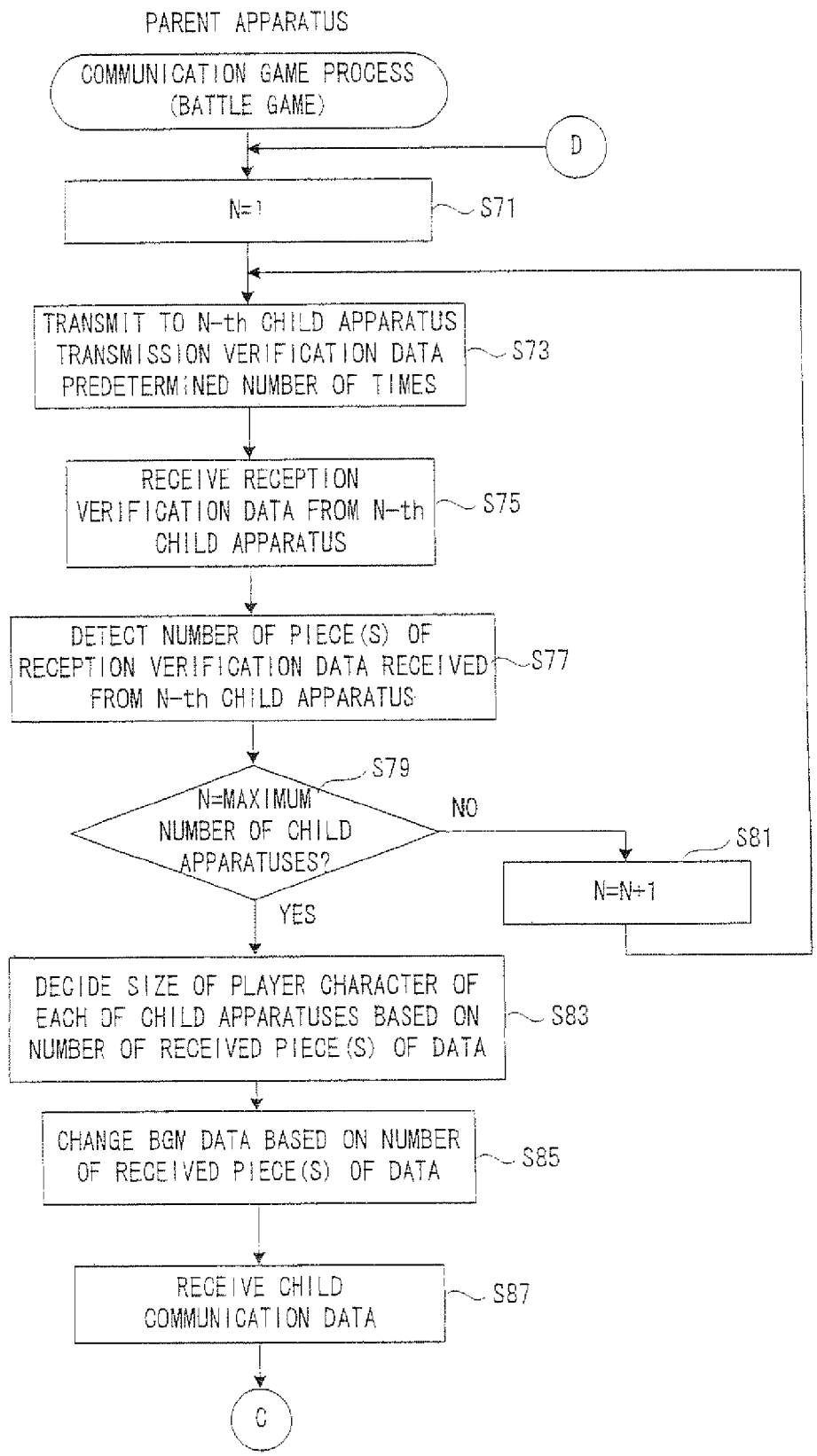
FIG. 17 is a flowchart showing one example of operation of communication game process during a battle game.

FIG. 17 shows one example of operation of communication game process of the parent apparatus during the battle game in this game system. In step S71 to step S81 of FIG. 17, the CPU core 42 of the parent apparatus performs processes for detecting the number of pieces of data received from each of the child apparatus. These processes of steps S71 to S81 are the same as those of steps S1 to S11 of FIG. 10, and thus a detailed description on them is omitted here.

If "YES" in the step S79, the CPU core 42 decides the size of player character of each of the child apparatus in a succeeding step S83, based on the number of the received pieces of data detected in communication with each child apparatus. In a step S85, the CPU core 42 changes sound data for BGM to be output, based on the number of the received pieces of data detected in communication with each of the child apparatus.

Subsequently, in a step S87, the CPU core 42 receives the child communication data transmitted from each of the child apparatus via the wireless communication unit 16, and stores it in a predetermined area of the WRAM 48. The child communication data includes the position data of the player character of this child apparatus itself, as shown in FIG. 16(A).

Figure 18:
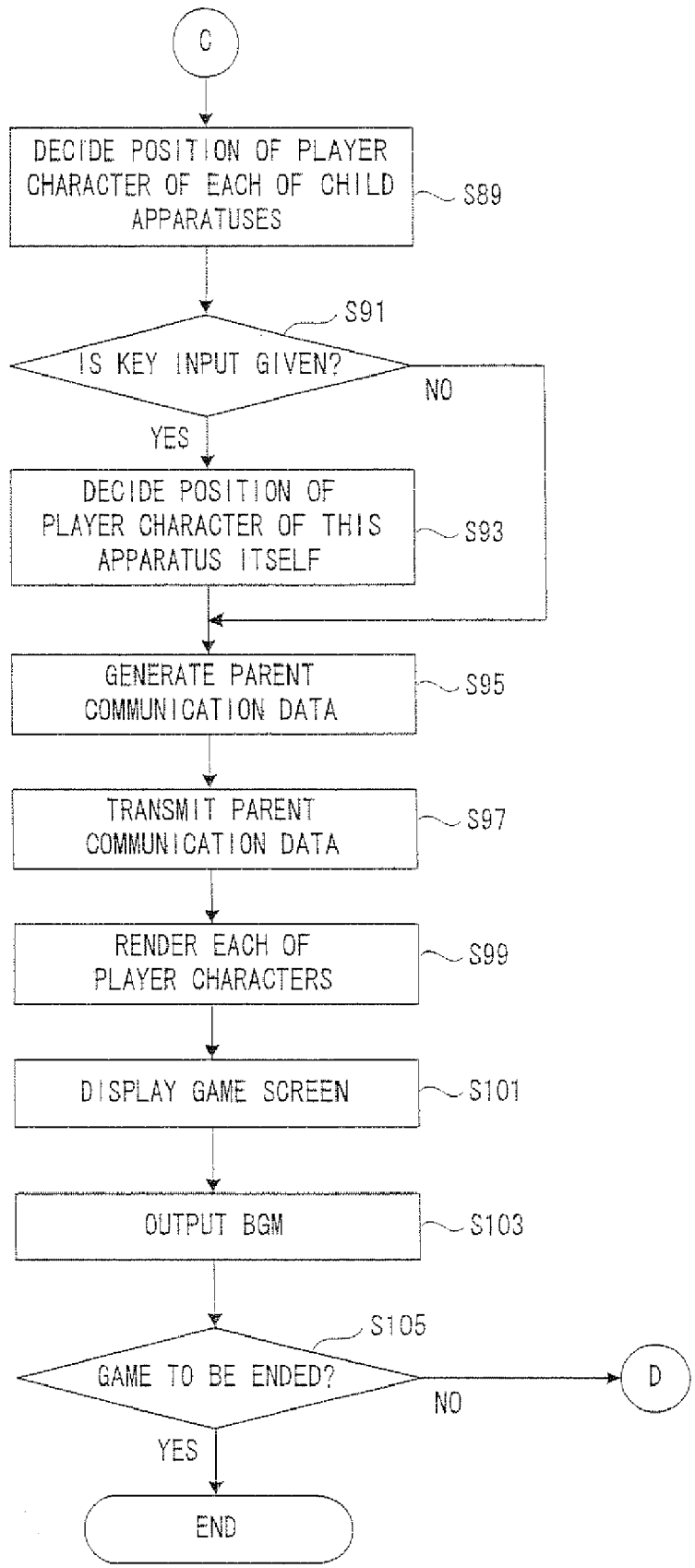
FIG. 18 is a flowchart continued from FIG. 17.

In a next step S89 of FIG. 18, the CPU core 42 decides the position of the player character of each of the child apparatus, based on the received position data of the player character of each of the child apparatus.

In a step S91, the CPU core 42 determines whether any operational input or key input by the operating switch 26 is given or not from this apparatus itself If "YES" in the step S91, the CPU core 42 decides in a step S93 the position of this game apparatus' own player character, based on the obtained operational input data. On the other hand, if "NO" in the step S91, the CPU core 42 proceeds directly to a step S95.

Following that, in the step S95, the CPU core 42 generates the parent communication data including the position data of each of the player characters and the data of the number of received pieces of data for each of the child apparatus, as shown in FIG. 16 (B). Then, in a step S97, the CPU core 42 transmits the parent communication data to each of the child apparatus via the wireless communication unit 16.

In a step S99, the CPU core 42 performs a process of rendering each of the player characters. More specifically, the CPU core 42 arranges each of the player characters in the game space, based on the size of each of the player characters decided in the step S83 and the position of the player characters of each of the child apparatus decided in the step S89, and the position of this apparatus' own player character decided in the step S93. At the same time, the CPU core 42 renders the image of a predetermined range of a game space containing this apparatus' own player character in the VRAM 50, i.e. a game screen, using each image data in the image data storage area 72. Then, in a step S101, the CPU core 42 displays the rendered game screen on the LCD 24 by means of the LCD controller 46.

Subsequently, in a step S103, the CPU core 42 performs a process of outputting BGM. More specifically, the CPU core 42 generates an audio signal based on the BGM data obtained in the step S85, outputs the audio signal to the audio amplifier 54, and then outputs the sounds of the BGM from the speaker 28.

Then, in a step S105, the CPU core 42 determines whether or not to end the game. For example, the CPU core 42 determines whether or not this apparatus' own player character has been defeated, whether or not all the other player characters have been beaten, or whether or not the end of the game is designated by operational input data from this apparatus itself If "NO" in the step S105, that is, if the game is to be continued, the CPU core 42 returns to the step S71 of FIG. 17 to repeat the processes. On the other hand, if "YES" in the step S105, the CPU core 42 ends this communication game process.

Figure 19:
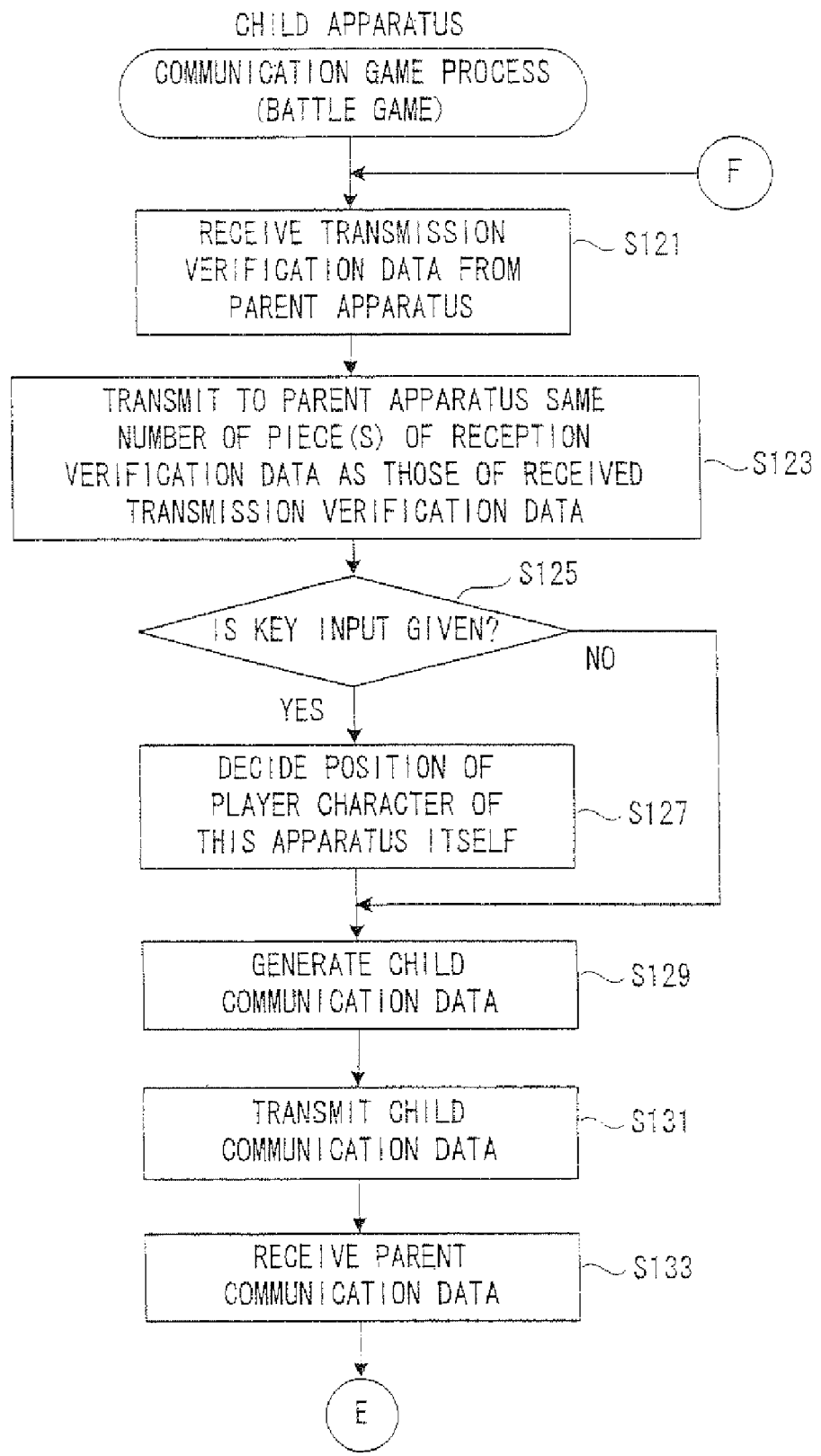
FIG. 19 is a flowchart showing one example of operation of communication game process during a battle game on the child apparatus.

FIG. 19 shows one example of operation of communication game process of the child apparatus during the battle game in this game system. Since the processes of step S121 and step S123 are the same as those of step S41 and step S43 of FIG. 12, a detailed description on them is omitted here.

In a step S125, the CPU core 42 determines whether any operational input or key input by the operating switch 26 is given or not from this apparatus itself If "YES" in the step S125, the CPU core 42 decides in a step S127 the position of player character of this apparatus' own, based on the obtained operational input data. On the other hand, if "NO" in the step S125, the CPU core 42 moves directly to a step S129.

In the step S129, the CPU core 42 generates the child communication data including the position data of the player character of this apparatus' own, as shown in FIG. 16(A). In a succeeding step S131, the CPU core 42 transmits the child communication data to the parent apparatus via the wireless communication unit 16.

Then, in a step S133, the CPU core 42 receives the parent communication data via the wireless communication unit 16, and stores it in a predetermined area of the WRAM 48. The parent communication data includes the position data of each of the player characters and the data on the number of the received pieces of data detected by the parent apparatus in communication with each of the child apparatus, as shown in FIG. 16(B).

Figure 20:
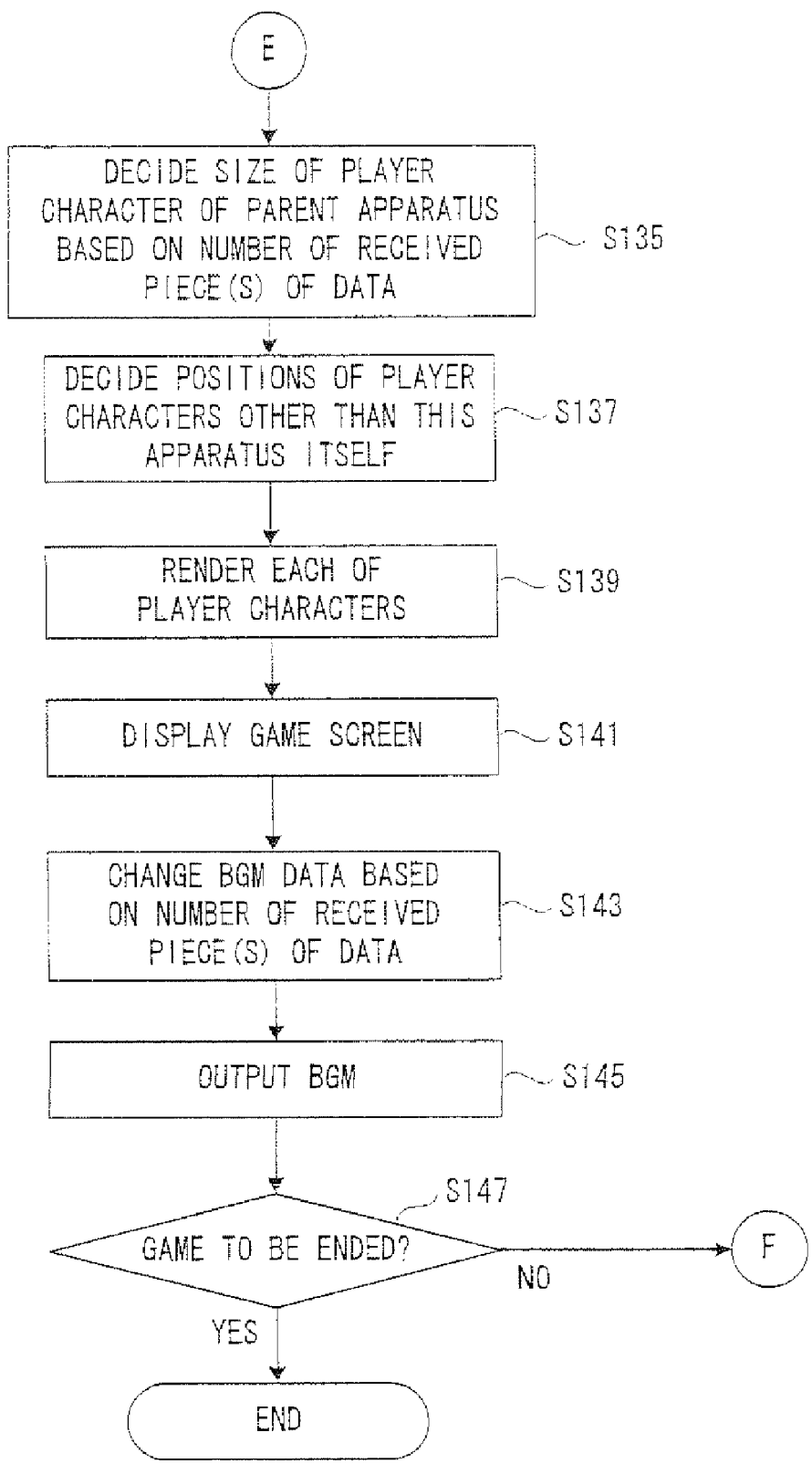
FIG. 20 is a flowchart continued from FIG. 19.

In a next step S135 of FIG. 20, the CPU core 42 decides the size of the player character of the parent apparatus, based on the data on number-of-received data corresponding to this apparatus itself, which is obtained from the parent communication data. Besides, if there exist a plurality of child apparatus, the size of each of the player characters corresponding to each of the other child apparatus may be decided in this process, on the basis of the data on number-of-received data corresponding to each of the other child apparatus, which is obtained from the parent communication data.

Subsequently, in a step S137, the CPU core 42 decides the position of each of the player characters other than this apparatus itself, based on the position data of each of the player characters, which is obtained from the parent communication data.

In a step S139, the CPU core 42 performs a process of rendering each of the player characters. More specifically, the CPU core 42 arranges each of the player characters in the game space, based on the size of the player character of the parent apparatus, etc. decided in the step S135, the position of the player character of this apparatus itself decided in the step S127, and the positions of the player characters other than this apparatus itself decided in the step S137. At the same time, the CPU core 42 renders in the VRAM 50 the image of a predetermined range of a game space containing the player character of this apparatus itself, i.e. a game screen, by means of each image data in the image data storage area 72. Then, in a step S141, the CPU core 42 displays the rendered game screen on the LCD 24 by means of the LCD controller 46.

In a step S143, the CPU core 42 changes sound data for BGM to be output, based on the data on number-of-received data corresponding to this apparatus itself, which is obtained from the parent communication data. Following that, the CPU core 42 performs a process of outputting the BGM in a step S145. More specifically, the CPU core 42 generates an audio signal based on the BGM data obtained in the step S143, and provides the audio signal to the audio amplifier 54 and outputs the sounds of the BGM from the speaker 28.

Then, in a step S147, the CPU core 42 determines whether or not to end the game. For example, the CPU core 42 determines whether or not this apparatus' own player character has been defeated, whether or not all the other player characters have been beaten, or whether or not the end of the game is designated by operational input data from this apparatus itself. If "NO" in the step S147, that is, if the game is to be continued, the CPU core 42 returns to the step S121 of FIG. 19 to repeat the processes. On the other hand, if "YES" in the step S147, the CPU core 42 ends this communication game process.

According to this illustrative embodiment, the number of the received pieces of reception verification data returned from the child apparatus in response to the transmission of the transmission verification data from the parent apparatus a predetermined number of times is detected, and the game process is varied according to the number of the received pieces of data detected in communication with each of the child apparatus. Therefore, this makes it possible to provide a novel and interesting game system in which the game details are changed according to the communication state between the game apparatus.

Additionally, in the above mentioned illustrative embodiments, the game apparatus 10 of the player 1 is described as playing the role of a parent apparatus at any time. In another illustrative embodiment, the game apparatus 10 may take turns in playing the role as a parent apparatus for a predetermined number of frames each, for example. Also, the role of the parent apparatus may be transferred from one to another each time when a predetermined requirement is satisfied (a specific item is obtained, for example) as well as for a predetermined number of frames each.

Moreover, in the above mentioned illustrative embodiments, the parent apparatus reduces the size of the player character corresponding to the child apparatus with a smaller number of received pieces of data for the child apparatus. Conversely, the parent apparatus may increase the size of the player character corresponding to the parent apparatus. Likewise, the child apparatus may increase the size of the player character corresponding to this apparatus itself (the child apparatus) with a smaller number of received pieces of data for the parent apparatus.

Although the illustrative embodiments have been described and illustrated in detail, it is clearly understood that the same is by way of illustration and example only and is not to be taken by way of limitation, the spirit and scope of the present invention being limited only by the terms of the appended claims.

What is claimed is:

1. A method of detecting proximity to a first apparatus of at least one second apparatus comprising the steps of:
   transmitting by a first apparatus wirelessly a plurality of data pieces from the first apparatus to the at least one second apparatus in a game;
   receiving wirelessly by the first apparatus at least one data piece responsively transmitted from the at least one second apparatus;
   counting by the first apparatus the data pieces received from the at least one second apparatus;
   comparing by the first apparatus the number of data pieces counted with the number of data pieces transmitted by the first apparatus; and
   determining a proximity of the at least one second apparatus to the first apparatus based at least in part on the variance between the number of data pieces counted and the number of data pieces transmitted.

2. The method of claim 1 further comprising the step of:
   displaying on a transmitting apparatus display at least an object corresponding to a transmitting apparatus and an object corresponding to a receiving apparatus; and
   altering the display of the object corresponding to the receiving apparatus based at least in part on the result of the determining step.

3. The method of claim 1 wherein the transmitting includes:
   transmitting a plurality of data pieces to each of a plurality of receiving apparatus;
   receiving at least one data piece transmitted from each of the plurality of receiving apparatus; said counting step including counting the data pieces received from each of the plurality of receiving apparatus;
   said comparing step including comparing the number of data pieces counted from each of the plurality, of receiving apparatus with the number of data pieces transmitted to each of the plurality of receiving apparatus; and
   said determining step including determining relative proximities of each of the plurality of receiving apparatus based at least in part on the variance between the number of data pieces counted from each apparatus and the number of data pieces transmitted to each apparatus.

4. A method of adjusting a wireless communication link between a first computer apparatus and at least one second computer apparatus, the method comprising the steps of:
   transmitting wirelessly a plurality of data pieces from the first computer apparatus to the at least one second computer apparatus in a game;
   counting a number of the plurality of data pieces received by the at least one second computer apparatus;
   transmitting wirelessly by the at least one second computer apparatus to the first computer apparatus at least one data piece in the game, wherein a number of the at least one data piece transmitted by the at least one second computer apparatus corresponds to the counted number of data pieces received by the at least one second computer apparatus;
   receiving wirelessly by the first computer apparatus the at least one data piece transmitted from the at least one second computer apparatus;
   counting by the first computer apparatus the data pieces received from the at least one second computer apparatus;
   comparing by the first computer apparatus the counted number of received data pieces with the number of data pieces transmitted by the first computer apparatus;
   determining a proximity of the first computer apparatus to the at least one second computer apparatus based at least in part on the comparison of the number of data pieces transmitted and the counted number of data pieces, and
   adjusting an image generated by the first computer apparatus depending on the determined proximity, wherein the adjusted image corresponds to an image controlled by the at least one second computer apparatus.

5. The method of claim 4 further comprising:
transmitting from the first computer apparatus to the at least one second computer apparatus information indicative of the comparison of the number of received data pieces counted with the number of data pieces transmitted.

6. The method of claim 4 wherein the transmission of a plurality of data pieces from the first computer apparatus includes transmission to a plurality of said second computer apparatuses, and
said first computer apparatus changes a priority rank of communication with each of said second computer apparatus based on the determined proximity with the corresponding one of said second computer apparatus.

7. The method of claim 6 wherein said first computer apparatus further comprises a first display which displays the communication priority rank for each of the second computer apparatuses.

8. A method of adjusting a wireless communication link between a first video game apparatus and at least one second video game apparatus, the method comprising the steps of:
transmitting wirelessly a plurality of data pieces from the first video game apparatus to at least one second video game apparatus;
counting a number of the plurality of data pieces received by the at least one second video game apparatus;
transmitting wirelessly by the at least one second video game apparatus to the first video game apparatus at least one data piece, wherein a number of the at least one data piece transmitted by the at least one second video game apparatus corresponds to the counted number of data pieces received by the at least one second video game apparatus;
receiving wirelessly the at least one data piece transmitted from the at least one second video game apparatus;
counting the data pieces data received from the at least one second video game apparatus;
comparing the number of received data pieces counted with the number of data pieces transmitted by the first video game apparatus;
determining a proximity of the first video game apparatus to the at least one second video game apparatus based at least in part on a difference between the number of data pieces transmitted by the first video game apparatus and the number of data pieces received from the at least one second video game apparatus, and
adjusting an image generated by the first video game apparatus depending on the determined proximity, wherein the adjusted image corresponds to an image controlled by the at least one second video game apparatus.

9. The method of claim 8 further comprising:
transmitting from the first video game apparatus to the at least one second video game apparatus information indicative of the comparison of the number of received data pieces counted with the number of data pieces transmitted.

10. The method of claim 8 wherein the transmission of a plurality of data pieces from the first video game apparatus includes transmission to a plurality of said second video game apparatuses, and
said first video game apparatus changes a priority rank of communication with each of said second video game apparatus based on the determined proximity of the corresponding second video game apparatus.

11. The method of claim 10 wherein said first video game apparatus further comprises a first display which displays the communication priority rank for each of the second video game apparatuses.

* * * * *